United States Patent [19]

Endo et al.

[11] Patent Number: 5,300,872
[45] Date of Patent: Apr. 5, 1994

[54] METHOD AND APPARATUS FOR CONTROL OF INVERTER

[75] Inventors: Tsunehiro Endo, Hitachiota; Shizuo Takahashi, Funabashi; Masaya Taniguchi; Hiroshi Maruyama, both of Shimizu; Seiji Ishida, Hitachi, all of Japan

[73] Assignee: Hitachi, Ltd., Tokyo, Japan

[21] Appl. No.: 838,336

[22] Filed: Feb. 20, 1992

[30] Foreign Application Priority Data

Feb. 20, 1991 [JP] Japan ................... 3-025972

[51] Int. Cl.$^5$ ............................... H02P 5/40
[52] U.S. Cl. ................... 318/802; 318/810
[58] Field of Search ........... 318/800, 803, 805, 807, 318/806, 809, 811, 802, 810

[56] References Cited

U.S. PATENT DOCUMENTS

| 4,099,109 | 7/1978 | Abbondanti | 318/811 |
| 4,346,434 | 8/1982 | Morinaga | 318/809 |

FOREIGN PATENT DOCUMENTS

| 0151418A1 | 1/1985 | European Pat. Off. |
| 0241920A2 | 4/1987 | European Pat. Off. |
| 0293915A3 | 6/1988 | European Pat. Off. |
| 58-191004 | 11/1983 | Japan |
| 62-51781 | 3/1987 | Japan |
| 62-89493 | 4/1987 | Japan |
| 63-28290 | 2/1988 | Japan |
| 2093288A | 1/1982 | United Kingdom |
| 2229870A | 3/1990 | United Kingdom |

*Primary Examiner*—John W. Cabeca
*Attorney, Agent, or Firm*—Antonelli, Terry, Stout & Kraus

[57] ABSTRACT

Inverter control method and apparatus which are immune to the influence of load disturbance and detection noise and permit stable minimization control of motor current, in order to attain high efficiency of an AC motor and of an inverter adapted to drive the same. A memory group is provided having a plurality of sets of memories for storage of data pieces representative of exciting current commands standing for manipulated variables and data pieces representative of motor currents standing for controlled variables. An upper limit value (IDUP) and a lower limit value (IDLW) defining a fluctuation region of the exciting current command are determined so that an exciting current command data piece corresponding to a motor current data piece which is the smallest of all the current data pieces in the memory group falls within the fluctuation region. The fluctuation region is determined so as to minimize the motor current, the exciting current command being fluctuated within the fluctuation region.

24 Claims, 24 Drawing Sheets

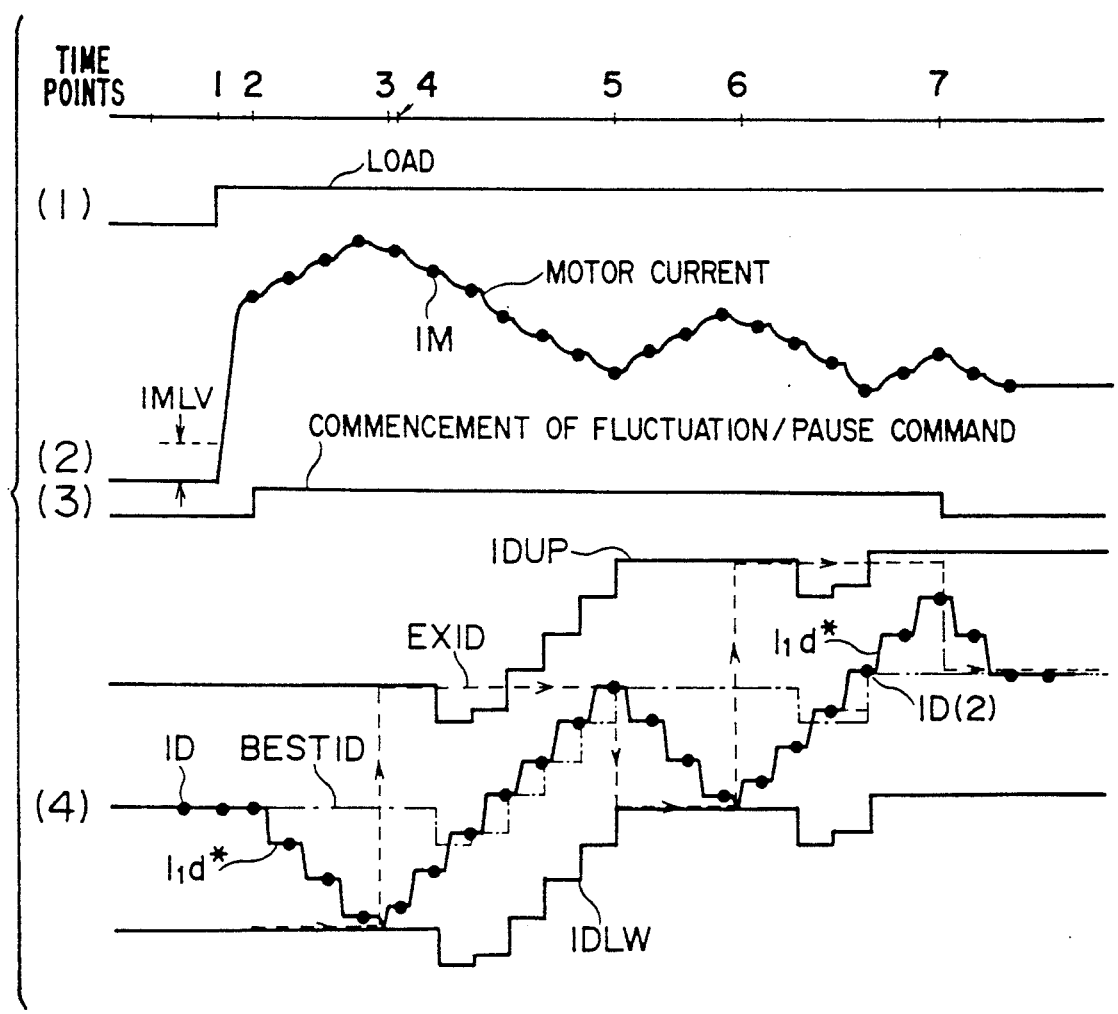

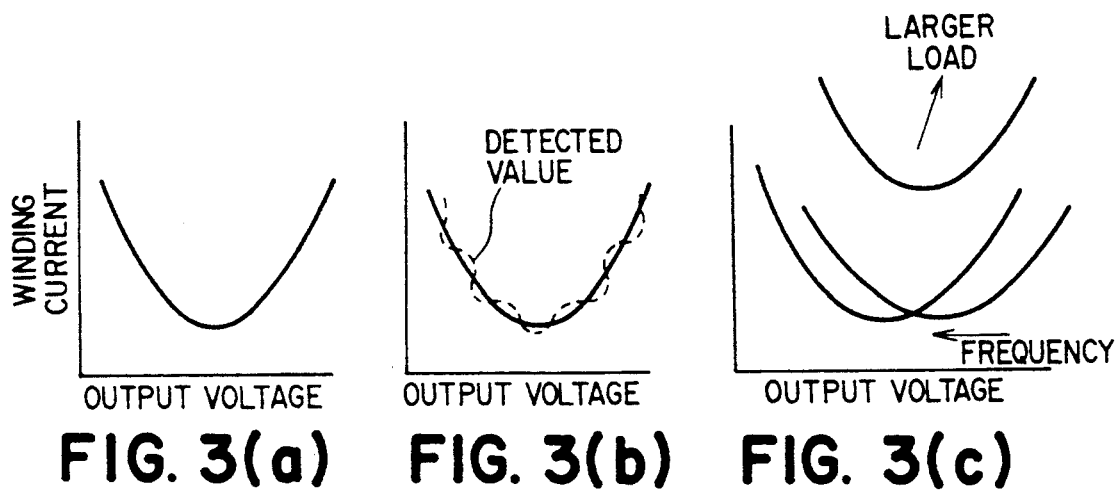
FIG. 3(a) FIG. 3(b) FIG. 3(c)
FIG. 4
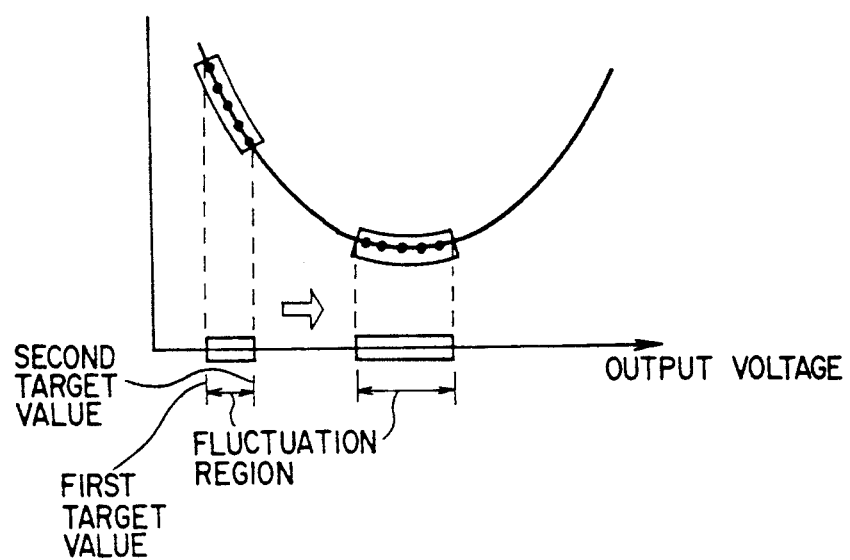

WHEN THE EXCITING CURRENT COMMAND IS INSIDE THE FLUCTUATION REGION

WHEN THE EXCITING CURRENT COMMAND IS OUTSIDE THE FLUCTUATION REGION

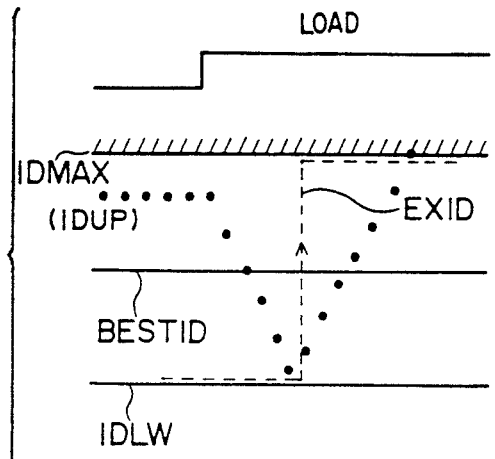 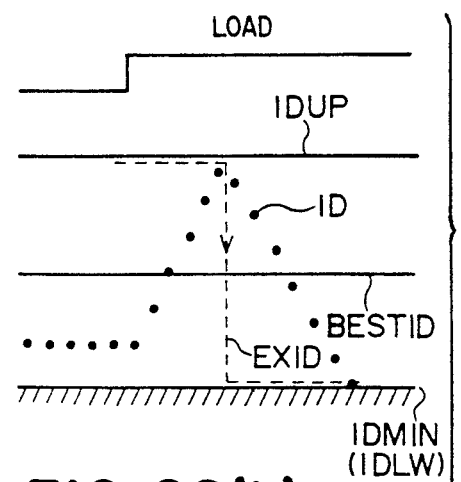
FIG. 22(a)   FIG. 22(b)
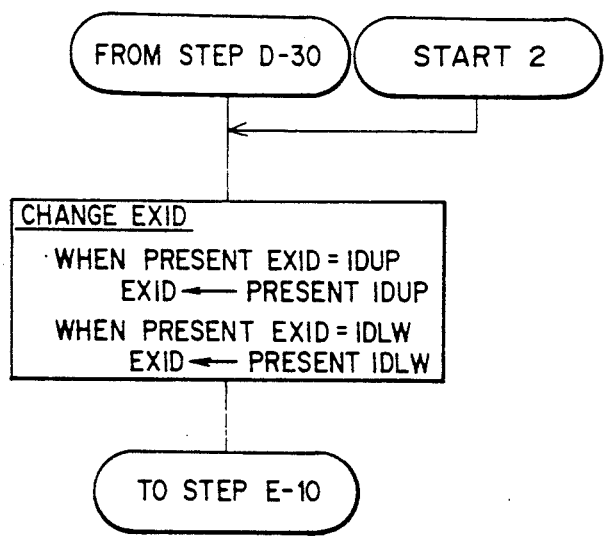
FIG. 23

(1) LOAD (2) OUTPUT VOLTAGE (3) WINDING CURRENT $f_1 = 60Hz$

METHOD AND APPARATUS FOR CONTROL OF INVERTER

BACKGROUND OF THE INVENTION

The present invention relates to an inverter adapted to controllably drive an AC motor and more particularly to a method and an apparatus for control of the inverter which are directed to minimization control of motor current.

As an extremum search circuit used for a process control system and the like, one shown in JP-A-58-191004 is available. The disclosed circuit searches for an extremum of a controlled variable in a control system in which the extremum of the controlled variable varying with a manipulated variable changes in accordance with a disturbance, and it is based on such a principle that a difference between a current controlled variable (value) and a preceding controlled variable (value) is determined every cycle at a predetermined period, the manipulated variable is further changed in the same direction as that in the preceding cycle if the difference value, i.e., the change occurs in a direction for approach to an extremum, but the manipulated variable is changed in a direction opposite to that in the preceding cycle if the change occurs in a direction for departure from the extremum, and the above sequential operation is repeated to cause the controlled variable to be controlled so as to approach the extremum.

On the other hand, a method for minimization control of motor current is known which is based on a similar principle to the above, whereby output voltage of an inverter is changed at a sampling time point, motor current is detected when it subsequently becomes stable, a difference between a detected value at a preceding sampling time point and a current detected value is determined, and the output voltage of the inverter is changed in the same direction as that in the preceding cycle if the motor current changes in its decreasing direction, but the output voltage of the inverter is changed in a direction opposite to that in the preceding cycle if the motor current changes in its increasing direction, thus causing the motor current to be controlled so as to approach a minimum value. As an example of the method for minimization control of motor current, a prior art method as shown in JP-A-62-51781 will now be described.

FIG. 28 shows a block diagram of the prior art inverter apparatus. In the figure, reference numeral 1 designates a commercial AC power source, 2 a converter for converting the output of the AC power source 1 into direct current, 3 a DC smoothing circuit for smoothing the DC output of the converter 2, 4 an inverter for converting direct current from the DC smoothing circuit 3 into alternating current, 5 an AC motor driven by the inverter 4, 7 a winding current detector/amplifier for detecting and amplifying input current to the winding of the AC motor 5, 11 a DC variable converter for converting a detected motor current value into a DC variable to detect an average value of the motor current, 8' a memory for storing the DC variable from the DC variable converter, 9' a comparator for comparing data representative of the DC variable from the DC variable converter 11 with stored current value data, 12' a pattern shift operation unit adapted to deliver a shift instruction for shifting an output voltage pattern on the basis of output data from the comparator 9' and a frequency command f* from a frequency command unit 14', and 16' an output voltage pattern storage unit in which a number of output voltage patterns of different output voltages V having a constant ratio between their magnitudes and frequencies F are stored and which responds to the frequency command f* and the shift instruction to deliver an output voltage command. Denoted by 9 is a PWM signal generator for generating a pulse width modulated signal (PWM signal) on the basis of the output voltage command, and by 10 is a drive circuit for driving switching elements of the inverter 4 on the basis of the PWM signal.

In the conventional current minimization control, running proceeds under a given output voltage pattern A and a motor current value at that time is detected and stored. Subsequently, running proceeds under an output pattern (A+1) and after a predetermined time delay, a motor current value at that time is compared with the previously stored motor current value If a decrease in the current is determined, the output voltage pattern is shifted to (A+2) of increased voltage. Conversely, if an increase in the current value is determined when the output voltage pattern is shifted from A to (A+1), the output voltage pattern is shifted to (A−1) of decreased voltage. In this manner, the output voltage pattern is shifted in a direction for decreasing the current value and when the current value increases from the preceding current value, the preceding output voltage pattern is decided to be optimum and is then fixed. This value is kept until the output frequency changes.

The conventional extremum search method and inverter control apparatus for minimization of motor current have constructions described as above and therefore they face a problem that when the disturbance or motor load changes or when the motor runs with its speed increased or decreased, an optimum manipulated variable (value) at which an extremum of the controlled variable is given or an optimum output voltage at which the motor current is minimized cannot be searched out. In the case of an inverter apparatus for minimization of, for example, motor current as the load decreases continuously and the motor current value decreases sympathetically, the motor current decreases regardless of the direction in which the output voltage of the inverter changes. Since in this case it is impossible to decide whether the motor current decreases on account of a decrease in load or on account of a change in output voltage, there sometimes occurs an inconvenience that the output voltage is fixed to a value indicative of not-optimum voltage or a divergent phenomenon that the output voltage is caused to continue increasing or decreasing Similar problems also take place when the motor current value is erroneously detected owing to noise and the like.

SUMMARY OF THE INVENTION

The present invention intends to solve the above problems and its object is to provide an inverter control method and an inverter control apparatus which are immune to the influence of load disturbance and detection noise to permit stable minimization control of motor current in order to attain high efficiency of an AC motor and an inverter adapted to drive the motor.

According to the invention, in a method of controlling an inverter in which the inverter receiving direct current and delivering alternating current controllably drives an AC motor by using its AC output voltage as a manipulated variable, when motor current increases or decreases starting from a running state at which input current to the motor is constant, the manipulated variable is changed at a running state subject to an increased or decreased motor current to pulsate the motor current and is sequentially determined in a direction in which an average value of the pulsating motor current decreases gradually.

In a specific method for this purpose, a fluctuation region is set up to permit the manipulated variable to fluctuate within a range defined by predetermined upper and lower limit values, and the fluctuation region is moved as the time elapses in a direction in which at least one of a change width and a change rate of the input current or output current of the inverter standing for a controlled variable is decreased.

For the fluctuation region, a first target value and a second target value are set which are defined by the upper and lower limit values, respectively, the manipulated variable is changed to approach one of the target values and when the manipulated variable tends to exceed the one target value, the other target value is set to an upper limit value or a lower limit value at that time, the manipulated variable is changed to approach the thus set target value and the two target values are moved as time elapses in a direction in which at least one of a change width and a change rate of the controlled variable decreases gradually.

For movement of the fluctuation region, there are provided a plurality of sets of paired data pieces of manipulated variables and corresponding controlled variables which are obtained before movement, a manipulated variable of a set having a corresponding controlled variable which is an extremum is selected from the plurality of sets, and the fluctuation region the manipulated variable is decided sequentially such that the selected manipulated variable falls within the fluctuation region.

The fluctuation width of the fluctuation region is selected so as to be small when the absolute value of a rate of change of the controlled variable relative to the manipulated variable is large, but to be large when the absolute value of the change rate is small.

The manipulated variable and the corresponding controlled variable are put together to set up a set, at least three are stored in a memory group, a memory of one set of the manipulated variable and controlled variable is updated every predetermined period in the memory group, a manipulated variable of a set having a corresponding controlled variable which is an extremum is selected from the memory group, the fluctuation region is so reset that the selected manipulated variable may fall within the fluctuation region, and a next value of the manipulated variable is set in a direction in which the selected manipulated variable approaches an upper limit value or a lower limit value of the fluctuation region.

In the inverter control of the present invention, the output voltage standing for the manipulated variable is determined in the manner described as above and therefore when an increase or a decrease in load, for example, causes the motor current to increase or decrease irrespective of the magnitude of the output voltage or when the motor current is detected erroneously on account of noise or the like, the output voltage can be controlled so as to minimize the motor current.

More particularly, the concept of a fluctuation region is newly introduced into the output voltage standing for the manipulated variable, so that the existence of the upper and lower limit values in the fluctuation region can prevent the output voltage from keeping increasing or decreasing excessively in a wrong direction. In addition, by moving the fluctuation region of output voltage defined by the upper and lower limit values in a direction in which the motor current is made to be smaller, the output voltage is caused to approach a value for minimization of the motor current while being pulsated. At that time, even in the presence of an erroneous detection of load change or motor current, the output voltage per se is still permitted to fluctuate only between the upper and lower limit values defining the fluctuation region. The direction of movement of the fluctuation region will be explained.

Firstly, in the case of erroneous detection of motor current due to noise and the like, the fluctuation region is once modified in a wrong direction but the motor current is constantly determined in its decreasing direction and so the wrong modification can be corrected. Then, in the case where as the load increases gradually, current increases gradually regardless of the output voltage being fluctuated, the current increases incessantly and so the direction in which the motor current is made to be smaller cannot be found, with the result that the fluctuation region is prevented from continuing moving and brought into a hold state. Further, in the case where as the load decreases gradually, current decreases gradually regardless of the output voltage being fluctuated, the current decreases incessantly and so the fluctuation region per se also moves up and down in accordance with fluctuation of the output voltage, with the result that the fluctuation region does not move in the same direction, either.

Also, in accordance with the present invention, it is not until the motor current changes from a running state of constant motor current owing to, for example, a change in load that the output voltage is so determined while the motor current being fluctuated up and down that the average of the fluctuation is made to be smaller, whereby erroneous detection of the motor current and an excessive increase or decrease in current due to the load change can be prevented.

Further, according to the invention, three or more sets of paired data pieces of motor current and output voltage are provided and an output voltage of a paired data piece having a minimum motor current can be used as a reference for determination of the direction of a new output voltage, thereby ensuring that immunity to detection noise can be improved as compared to the conventional method in which the next output voltage is determined in accordance with a gradient between two points representative of different sets of motor current and output voltage.

BRIEF DESCRIPTION OF THE DRAWINGS

FIG. 1 is a diagram for explaining an embodiment of dynamic characteristics of the invention obtained when the load changes stepwise;

FIGS. 3(a)-3(c) show graphically characteristics of an embodiment of a control system according to the invention;

FIG. 4 is a graph useful to explain the main point of an embodiment of the invention;

FIGS. 22(a)-22(b) are diagrams for explaining still another example of operation of the embodied inverter apparatus;

FIG. 23 is a flow chart for explaining a construction of a modification of the invention in which the essential part of the embodied converter apparatus is modified;

DESCRIPTION OF THE PREFERRED EMBODIMENTS

The present invention will now be described by way of example with reference to the accompanying drawings.

Referring to FIGS. 2(a)-2(b) and 3-4, the basic concept an embodiment of the invention will first be described.

Figure 2A:
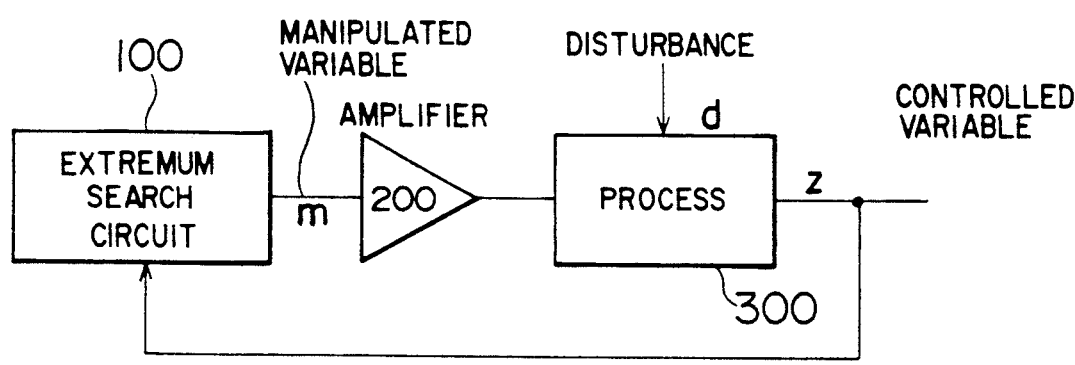
FIG. 2(a) is a diagram showing the construction of a control system to which the invention is applied and FIG. 2(b) is a graph depicting characteristics of the control system.
Figure 2B:
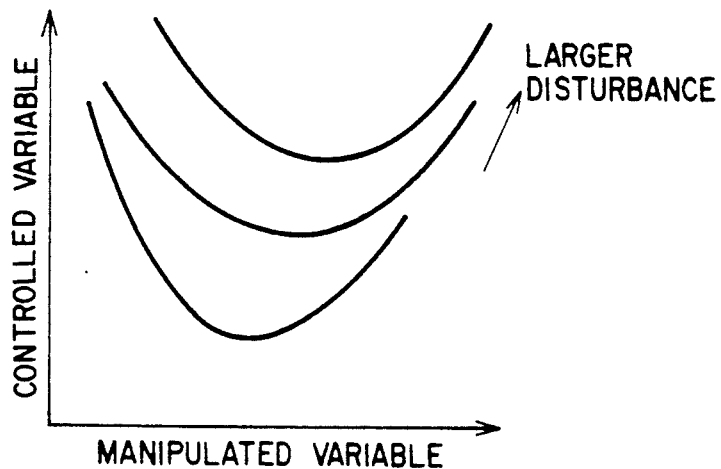

Shown in FIG. 2(a) is a diagram illustrating a general construction of the invention and in FIG. 2(b) is a graph depicting characteristics of a control system to which the invention is applicable. As shown in FIG. 2(a), an extremum search circuit 100 receives a controlled variable z and delivers a manipulated variable m. The manipulated variable m is amplified with an amplifier 200 and then inputted to a process 300. The process is applied with a disturbance d and it delivers outputs of which one serves as the controlled variable z. The manipulated variable is related to the controlled variable as graphically shown in FIG. 2(b). Namely, for a constant disturbance, there is a manipulated variable (value) at which the controlled variable assumes an extremum (a minimum in FIG. 2(b)). The aforementioned extremum search circuit searches extrema to determine the manipulated variable at which the extremum is provided.

When specifying the general construction diagram shown at (a) in FIG. 2(a) by regarding the process as an induction motor, the amplifier as an inverter for driving the induction motor, the controlled variable as winding current flowing in the induction motor and the disturbance as load torque of the induction motor and/or output frequency of of the inverter, the manipulated variable corresponds to output voltage of the inverter. Examples of graphical representations of characteristics corresponding to those in FIG. 2(b) are shown in FIGS. 3(a)-3(c). More particularly, as known in the art, winding current flowing in the induction motor has a magnitude which changes with the magnitude of voltage (output voltage of the inverter) applied to the winding and an output voltage exists at which a minimum value of the winding current is provided.

When searching extrema, the winding current standing for the controlled variable is detected but disadvantageously, because of pulsating components and noises contained in a detected value, the output voltage is related to the detected value through local extrema occurring as shown by dotted curve in FIG. 3(b). On the other hand, when the load torque and the frequency change, many extrema take place as shown in FIG. 3(c).

To prevent an erroneous decision of mistaking the local extrema occurring during the extremum search and temporary extrema occurring upon the change of disturbance for true extrema, an extremum search circuit of the invention may first provide output voltage standing for the manipulated variable with either a fluctuation region or two target values of change of the output voltage as shown in FIG. 4 so that the fluctuation region or the two target values may be moved towards a direction in which an extremum exists.

An embodiment of the invention will now be described specifically.

<Overall Construction>

Figure 5:
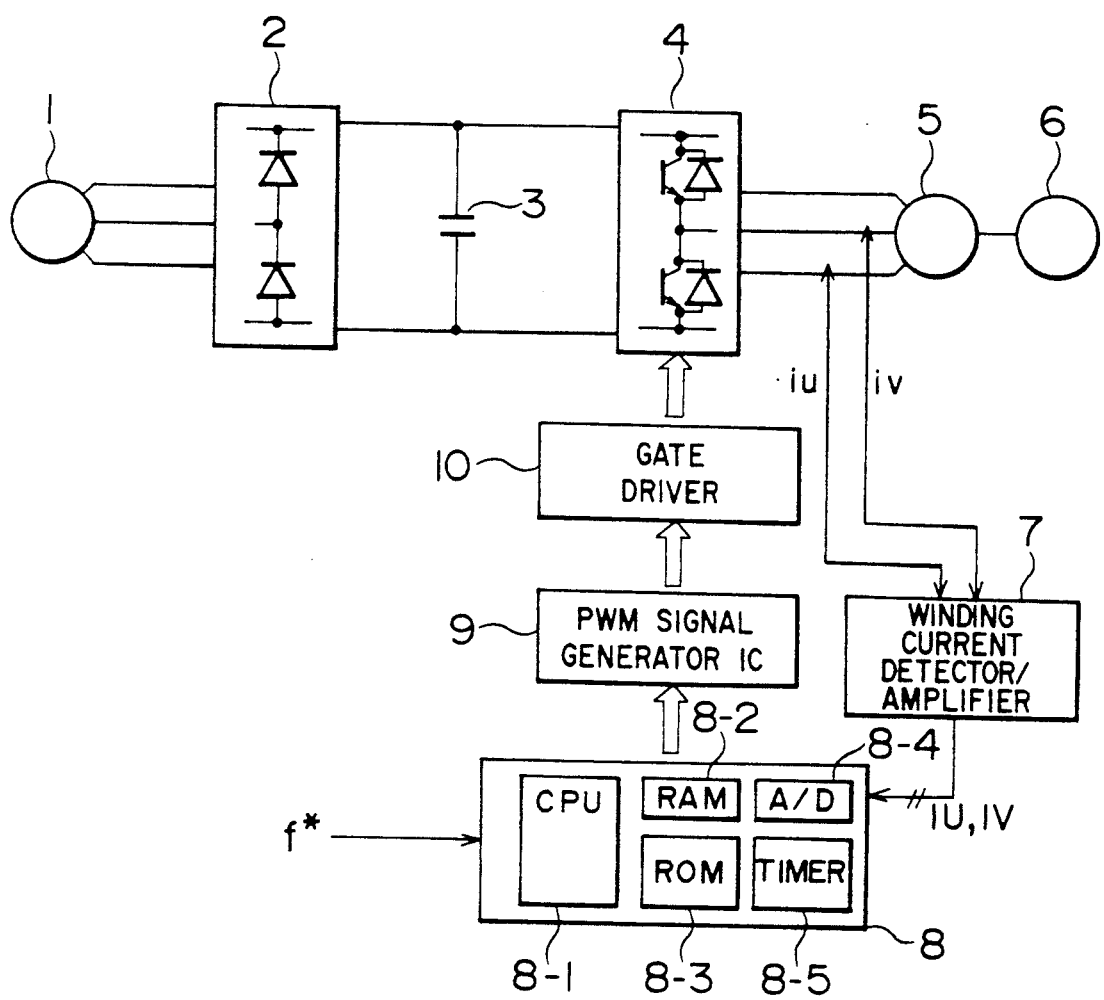
FIG. 5 is a block diagram showing an overall construction of an embodiment of an inverter apparatus according to the invention.
Figure 28:
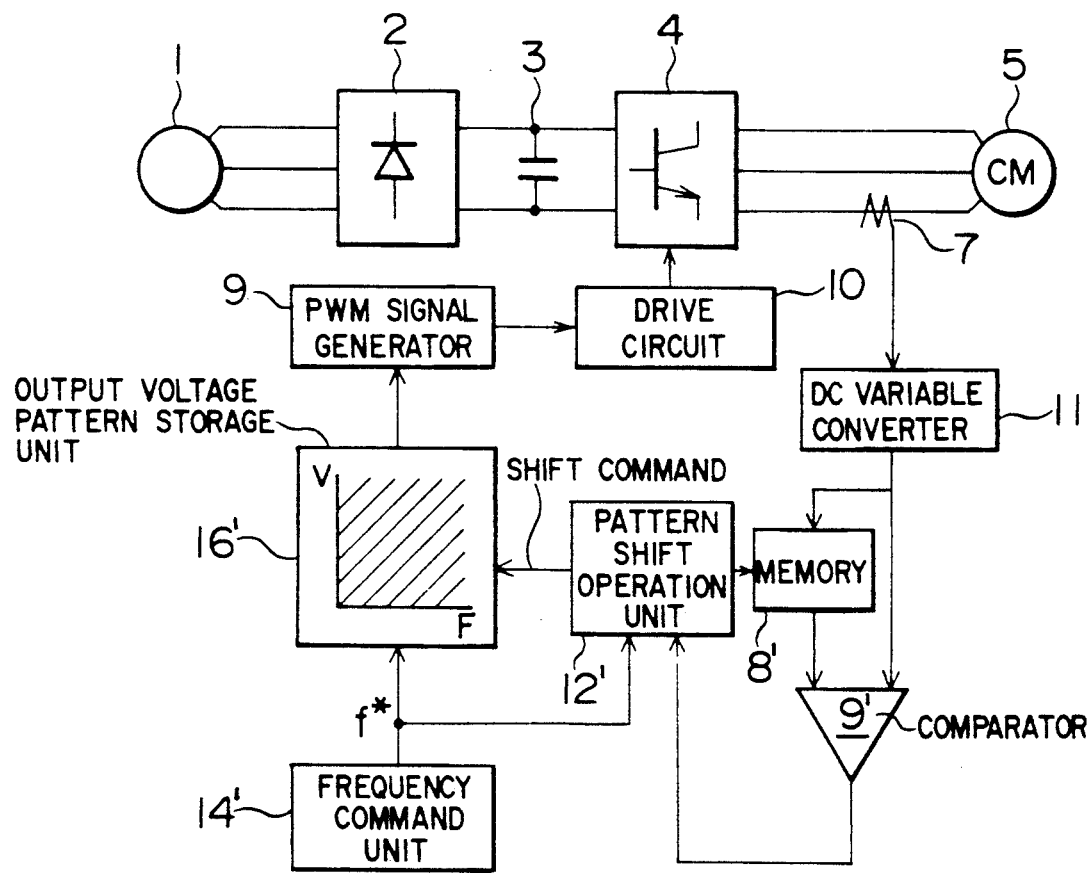
FIG. 28 is a block diagram for explaining a prior art example of control.

FIG. 5 is a block diagram showing a schematic construction of an inverter apparatus according to the invention. Exemplarily, in the embodiment to be described here, an induction motor for driving a compressor constituting an air conditioner or a refrigerator is operated at varying speeds by means of the inverter apparatus. In FIG. 5, components designated by reference numerals 1 to 5 are the same as those of FIG. 28 and will not be described herein. Reference numeral 6 designates a compressor loaded on the induction motor, 7 a winding current detector/amplifier adapted to detect and amplify winding currents iu and iv flowing in the winding of the induction motor 5, and 8 a control-/operation unit inputted with an output frequency command f* for the inverter and current signals IU and IV from the winding current detector/amplifier to deliver time data. The control/operation unit 8 includes a microcomputer of CPU 8-1, a memory of RAM 8-2 and ROM 8-3, an A/D converter 8-4 and a timer 8-5. Denoted by 9 is a PWM signal generator IC for generating a PWM signal in accordance with the time data from the control/operation unit 8 and by 10 is a gate driver responsive to the PWM signal to generate drive signals for driving the gates of a plurality of switching elements in inverter 4.

Figure 6:
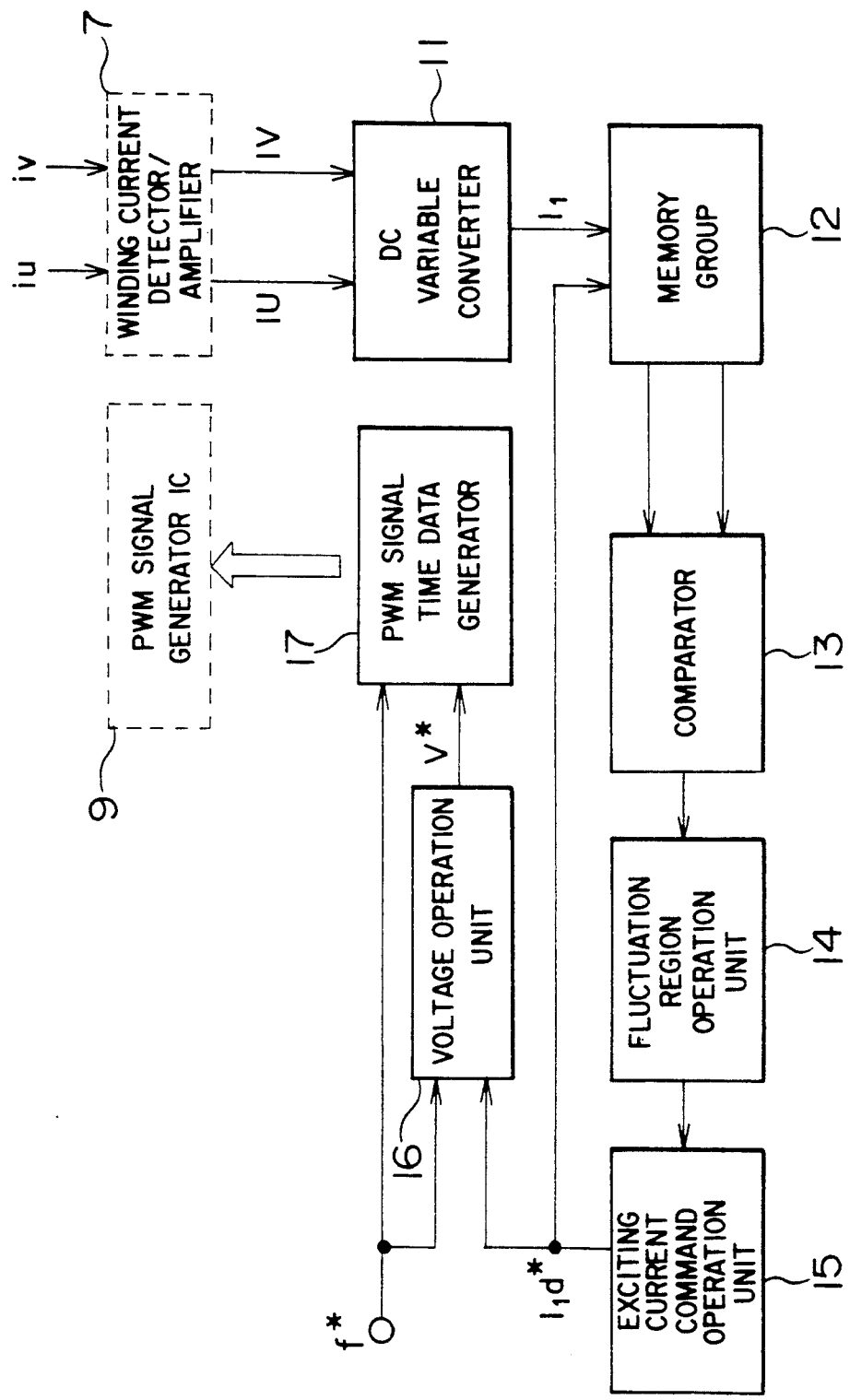
FIG. 6 is a block diagram showing a construction of the essential part of the embodied inverter apparatus.

In the control/operation unit 8, a control operation corresponding to the operation of the extremum search circuit shown in FIG. 2(a) is executed. FIG. 6 shows a control/operation block corresponding to the extremum search circuit. In FIG. 6, reference numeral 11 designates a DC variable converter responsive to the winding current detected values IU and IV produced from the winding current detector/amplifier 7 to generate a motor current Il in the form of a DC variable, 12 a memory group for storing a plurality of sets of motor current Il and exciting current command Ild* to be described later which stands for the manipulated variable, 13 a comparator for comparison of magnitudes of the plurality of motor currents or magnitudes of the plurality of exciting current commands mainly stored in the memory group 12, 14 a fluctuation region operation unit for determining, on the basis of a comparison result produced from the comparator 13, a region in which the exciting current command Ild* is fluctuated, 15 an exciting current command operation unit for determining a value by which the exciting current command Ild* is to be changed actually in accordance with a result produced from the fluctuation region operation unit 14, 16 a voltage operation unit responsive to the inverter output frequency command f* and exciting current command Ild* to calculate an output voltage command V* of the inverter, and 17 a PWM signal time data generator responsive to the output frequency command f* and output voltage command V* of the inverter to determine time data for output voltage of the inverter.

Since in this embodiment the output voltage command V* of the inverter is given pursuant to expression 1 below to control the output voltage by selecting the exciting current command Ild* as a parameter for changing the output voltage of the inverter, the exciting current command Ild* serves as the manipulated variable in the present embodiment. It is to be noted that the output voltage command V* is proportional to the exciting current command Ild* as will be seen from expression 1 and therefore, obviously, the output voltage command V* may alternatively be used as the manipulated variable.

[Expression 1]

$$V^* = Ild^* \cdot lm \cdot 2 \cdot \pi \cdot f^*$$

where

V*: output voltage command
Ild*: exciting current command
lm: exciting inductance
f*: output frequency command.

The major part of the extremum search circuit shown in FIG. 6 will now be described in greater detail.

<Motor Current Detection>

Figures 7, 8:
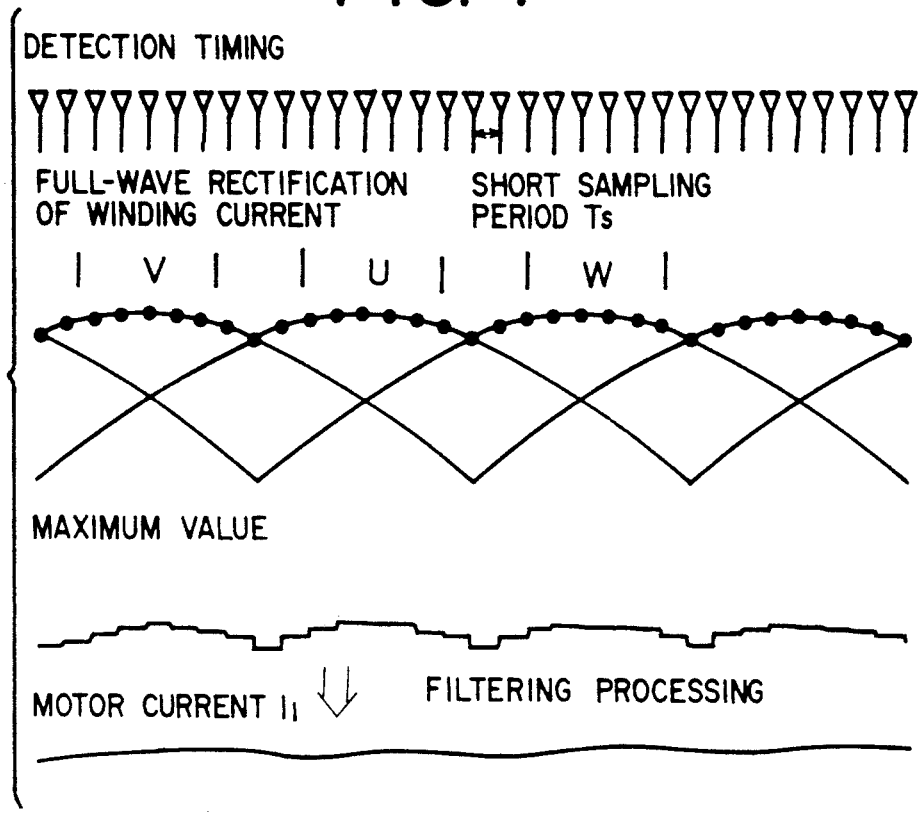
FIG. 7 is a diagram useful to explain the operation of the essential part in a current detection method applied to the embodied inverter apparatus.
FIG. 8 is a diagram showing a structure of a main memory of the embodied inverter apparatus.

FIG. 7 is a diagram illustrative of the contents of processing in the DC variable converter 11. This processing is executed every short sampling period Ts and consists of five kinds of contents.

(1) The winding current detected values IU and IV delivered out of the winding current detector/amplifier 7 are converted by the A/D converter 8-4 into digital variables which in turn fetched into the control operation unit 8.

(2) The remaining winding current IW is determined pursuant to expression 2 below.

[Expression 2]

$$IW = -IV - IW.$$

(3) Full-wave rectified values $|IU|$, $|IV|$ and $|IW|$ of three-phase winding currents are determined.

(4) A maximum value is determined every short sampling period by comparing the full-wave rectified values of respective phases.

(5) The aforementioned maximum value is subjected to filtering processing to provide the motor current Il.

As described above, in the present embodiment, the motor current Il determined with the DC variable converter 11 is treated as a detected variable of the winding current standing for the controlled variable and an exciting current command is searched which minimizes the motor current Il.

<Structure of Memory and Storage of Data>

The RAM 8-2 shown in FIG. 5 has a major RAM related to the invention for which the memory group 12 shown in FIG. 6 is used having such a structure as will be described with reference to FIG. 8. As shown in FIG. 8, five pieces of motor current data IM(0) to IM(4) and five pieces of exciting current command data ID(0) to ID(4) are stored in the memory group 12. Data of motor current Il and exciting current command Ild* is obtained every long sampling period Tl to be described later and a set of IM(0) and ID(0) represents new data obtained currently during the period Tl. A motor current and an exciting current command obtained at a sampling cycle preceding by i are represented by IM(i) and ID(i).

<Rule for Fluctuation of Exciting Current Command>

A basic rule in a method of fluctuating exciting current command will, now be described with reference to FIGS. 9(a)–9(b) and 10. A first point of the rule is as follows.

Figure 9A:
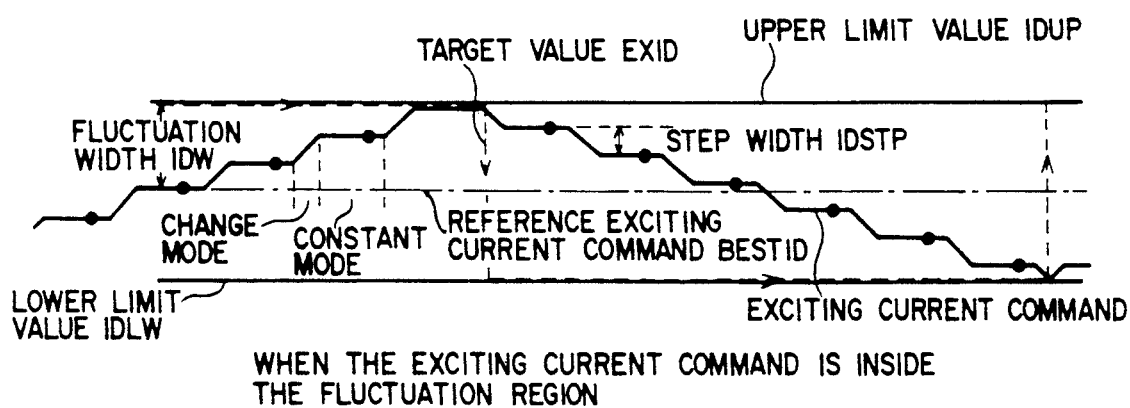
FIGS. 9(a)-9(b) are diagrams useful to explain an exciting current command fluctuation method applied to the embodied inverter apparatus.
Figure 9B:
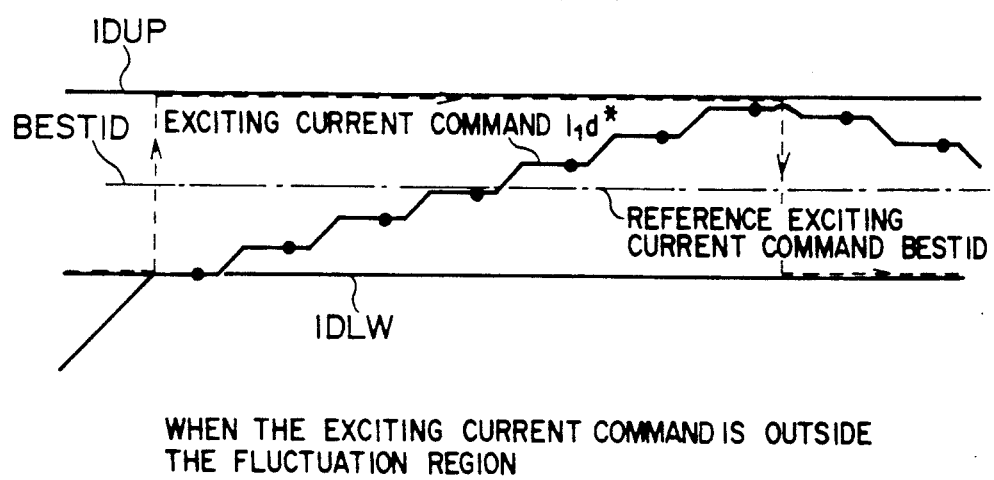

In order to give a fluctuation region to an exciting current command to be fluctuated, an upper limit value IDUP and a lower limit value IDLW are set and when the exciting current command has already been inside the fluctuation region, the exciting current is changed toward a target value EXID of either the upper limit value or the lower limit value as shown in FIG. 9(a). Conversely, when the exciting current command is outside the fluctuation region as shown in FIG. 9(b), the exciting current is so changed as to lie inside the fluctuation region. In the figure, the aforementioned target value EXID is indicated by dotted line and a medium value between the upper and lower limit values is defined as a reference exciting current command BESTID. A black dot mark in the figure denotes a timing for storing the motor current data IM(0) and exciting current command data ID(0) in the memory group 12.

A second point of the rule is such that within the fluctuation region, two modes are set up of which one is for making the exciting current constant and the other is for changing the exciting current stepwise. The magnitude of the exciting current to be made to be constant is so selected that a few levels can be set up within the width of the fluctuation region. In the present embodiment, a step width IDSTP representative of a difference between a certain constant exciting current level and a level next to it is so selected as to be 30% of half the width of the fluctuation region. It is noted that the half of the fluctuation region width is simply referred to as a fluctuation width IDW in the present embodiment.

It is also noted that, in the present embodiment, as the exciting current command on an excursion of the change mode reaches a target value, the direction of change is switched to a new target value which is the upper limit value or lower limit value as viewed from the presently reached target value.

Figure 10:
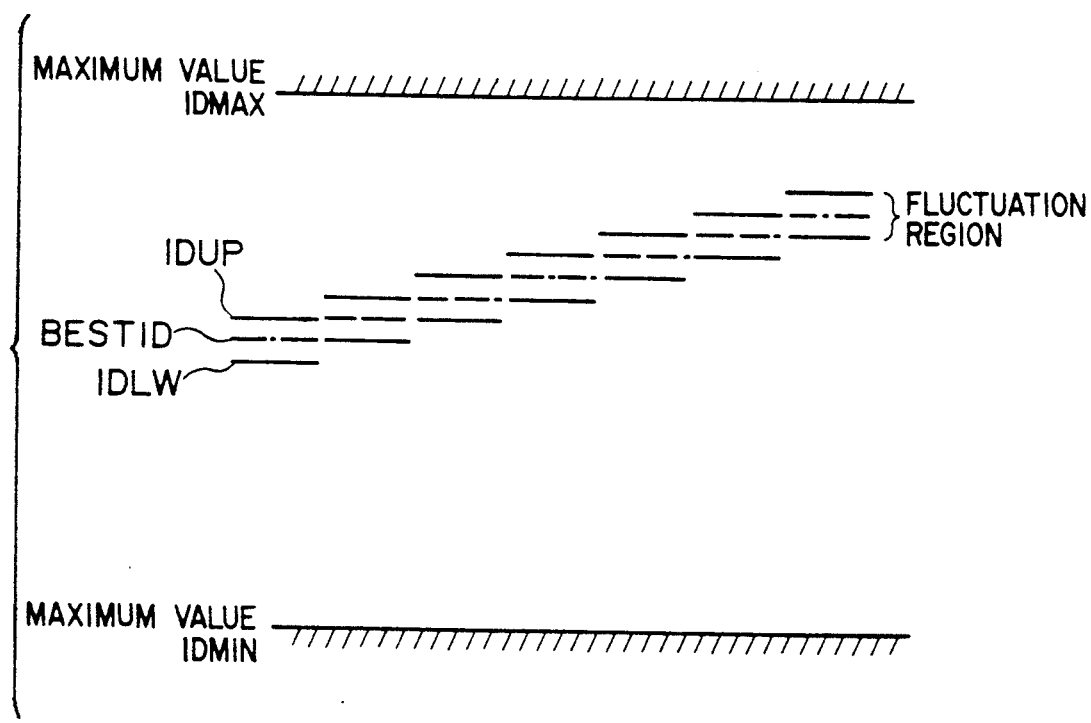
FIG. 10 is a diagram useful to explain another exciting current command fluctuation method applied to the embodied inverter apparatus.

A third point of the rule is such that a maximum value IDMAX and a minimum value IDMIN are provided for the exciting current command per se and fluctuation regions of exciting current are determined within a range defined by the maximum and minimum values as shown in FIG. 10. More specifically, the relation pursuant to expression 3 below is always satisfied.

[Expression 3]

IDUP ≦ IDMAX

IDLW ≧ IDMIN.

<Specific Control Method>>

<Processing Construction and Execution Timing>

A specific control processing method for extremum search grounded on the previously-described motor current detection method, data storage method and rule for fluctuation of exciting current command will be described with reference to FIGS. 11 to 21 and 22(a)-22(b).

Figure 11:
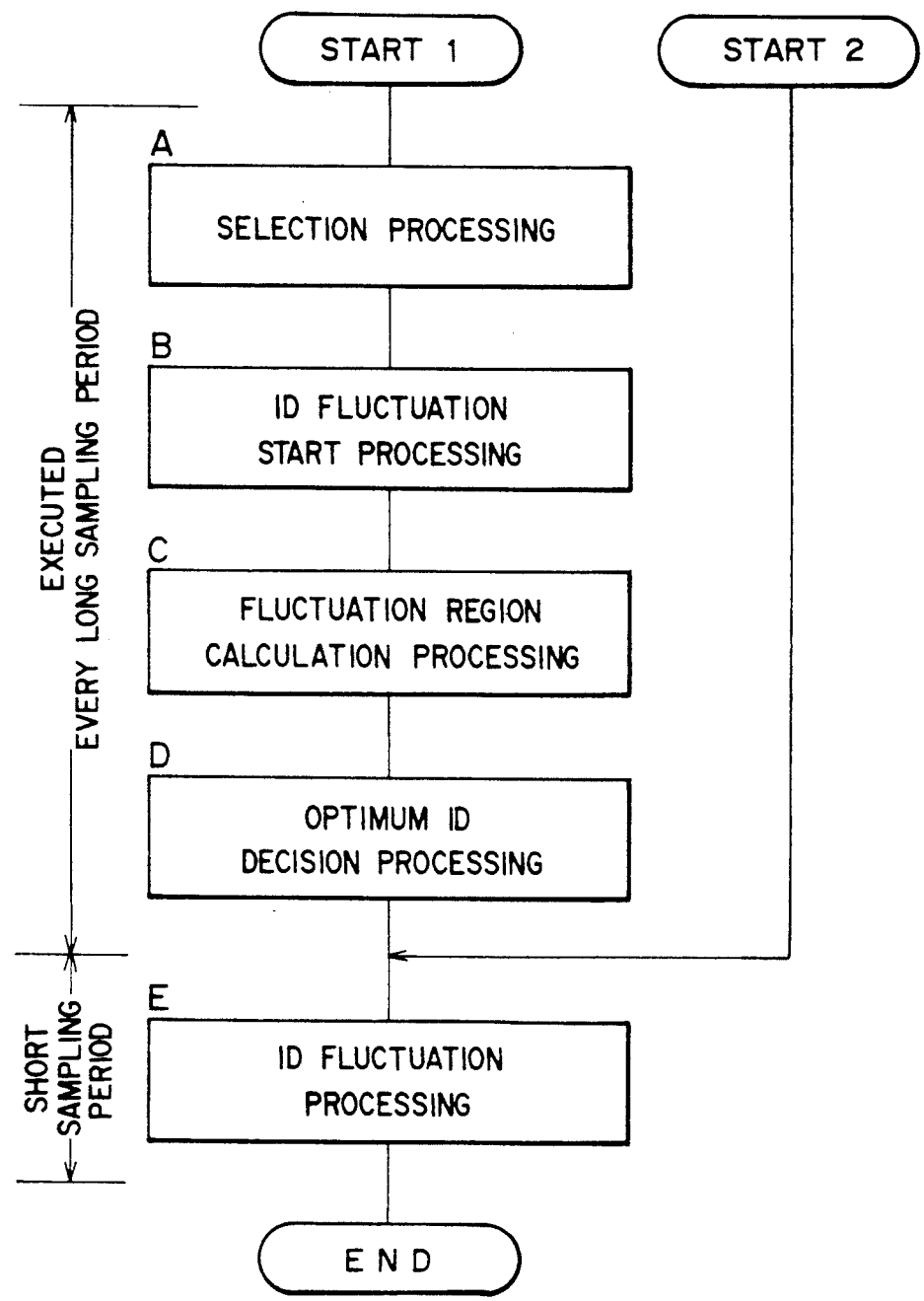
FIG. 11 is a flow chart showing a construction of a main control processing in the embodied inverter apparatus.

FIG. 11 is a flow chart showing the construction of processing. The whole control processing is mainly divided into five kinds of contents including processing blocks A to E to be described below.

In processing block A which is a BESTID selection processing, movement of data in the memory group 12 is carried out, minimum motor current data is selected from the five pieces of motor current data IM(0) to IM(4), and exciting current command data corresponding to the selected minimum motor current data is found out to provide a BESTID. In processing block B which is an ID fluctuation start processing, while a change amount of motor current being prepared, the exciting current command is decided as to whether to be fluctuated depending on whether the change amount exceeds a predetermined magnitude and when the condition is satisfied, preparation for fluctuation is carried out. In processing block C, a fluctuation region of exciting current command defined by upper limit value IDUP and lower limit value IDLW is determined in accordance with the BESTID selected in block A. In processing block D, the aforementioned BESTID is checked for its being an optimum exciting current command which minimizes the motor current and if so, preparation for stopping fluctuation of exciting current is carried out. In the final ID fluctuation processing, the exciting current command is changed in accordance with the rule for changing the exciting current described previously.

Figure 12:
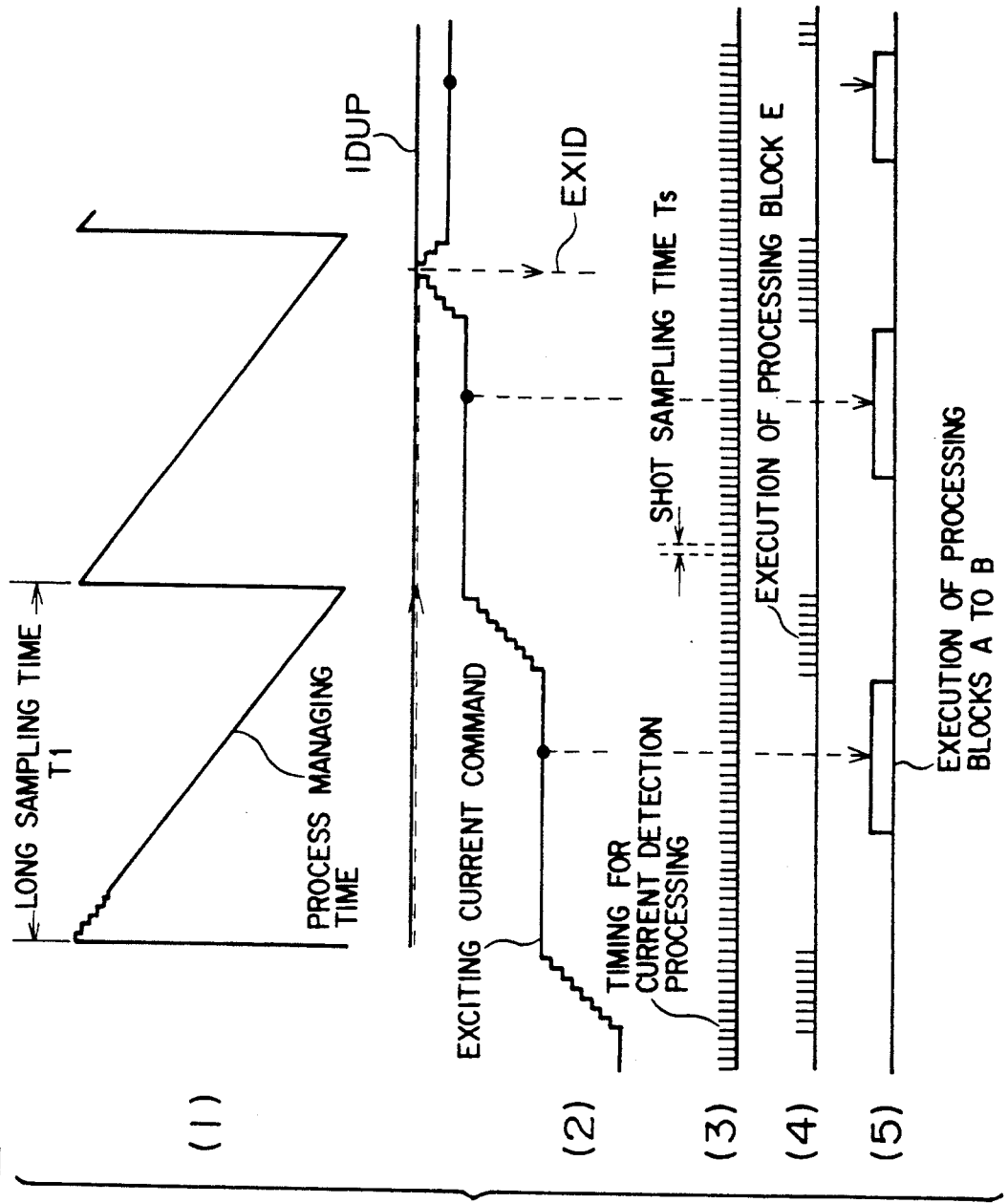
FIG. 12 is a timing chart for explaining the timing for execution of the main control processing in the embodied inverter apparatus.

The processing blocks A to D are executed every long sampling period Tl and the processing block E is executed repetitively every short sampling period Ts by cycles to be described later during the long sampling period. The above will be detailed with reference to FIG. 12. Shown at (1) in FIG. 12 is the movement of the process managing timer, indicating that the long sampling period Tl equals one period. Shown at (2) in FIG. 12 is the change of the exciting current command, indicating that time for one set of the constant mode and change mode of exciting current command described previously amounts to Tl. Shown at (3) in FIG. 12 is the timing for execution of the current detection processing to be executed in the DC variable converter 11 as described previously, indicating that the timing occurs at the short sampling period and provides a time base of the process managing timer. Then, as shown at (4) in FIG. 12, the processing block E is executed repetitively by cycles through which the exciting current command reaches the next constant level, thus completing the change mode of the exciting current command. The other processing blocks are sequentially executed at a timing shown at (5) in FIG. 12.

The contents of each control block will now be described.

<BESTID Selection Processing>

Figure 13:
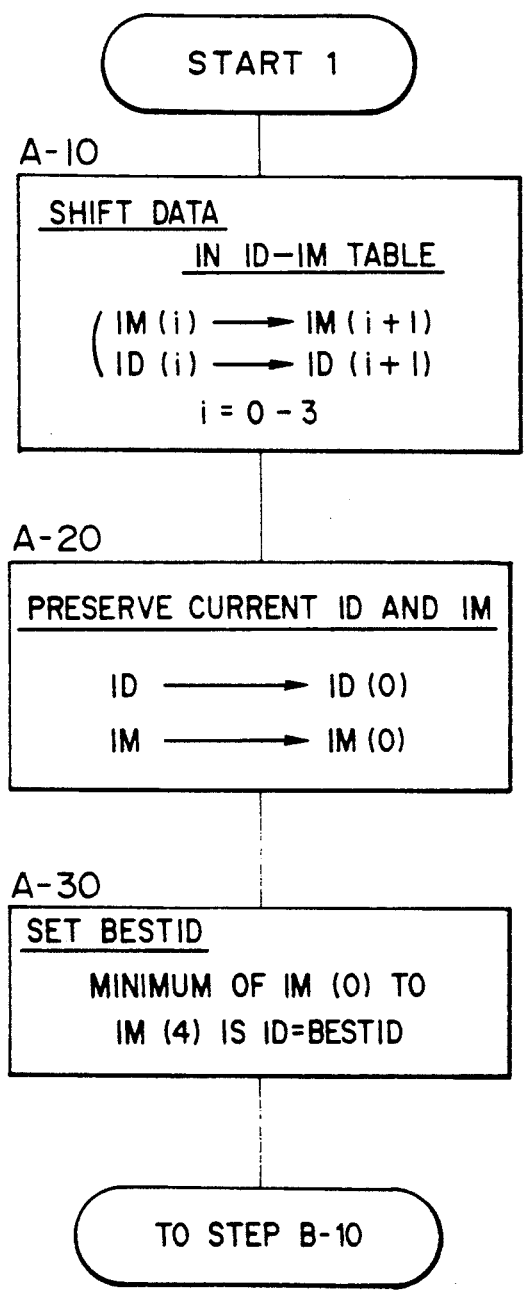
FIG. 13 is a flow chart showing a detailed construction of a first step of the main control processing in the embodied inverter apparatus.

FIG. 13 shows the contents of the BESTID selection processing. This processing is mainly divided into three steps A-10 to A-30. In step A-10, movement of data in the memory group 12 is carried out and in step A-20, an exciting current command and a motor current at that time are stored, as ID(0) and IM(0), respectively, in the memory group 12. In step A-30, minimum motor current data is selected from the motor current data pieces IM(0) to IM(4) stored in the memory group and an exciting current command corresponding to the selected data is determined to be a BESTID.

<ID Fluctuation Start Processing>

Figure 14:
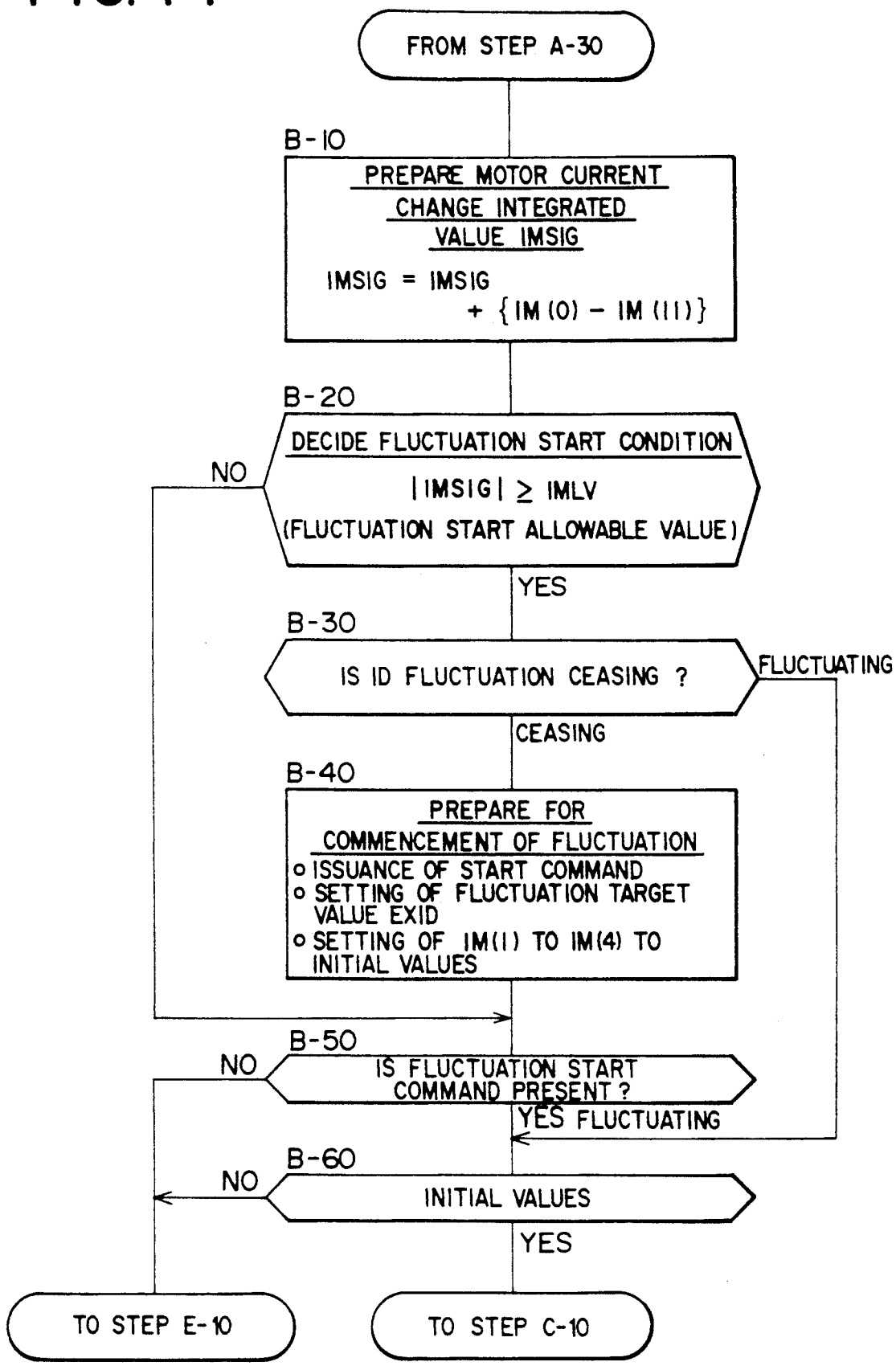
FIG. 14 is a flow chart showing a detailed construction of a second step of the main control processing in the embodied inverter apparatus.

The ID fluctuation start processing shown in FIG. 14 has the contents including steps B-10, B-20, B-30, B-40, B-50 and B-60. In step B-10, a difference between the motor current data pieces IM(0) and IM(1) stored in the memory group, i.e., a difference between motor current data obtained at the present sampling time and that obtained at the preceding sampling time is added to a motor current change integrated value IMSIG to update the same. Then, the magnitude of an absolute value of a thus resulting IMSIG is decided as to whether to exceed a fluctuation start allowable value IMLV (step B-20).

With the absolute value of IMSIG exceeding IMLV, it is decided whether the fluctuation of the exciting current command is ceasing at that time (step B-30), and if the fluctuation is ceasing, the procedure proceeds to step B-40. In step B-40, preparation for commencement of the fluctuation is carried out. More specifically, a fluctuation start command is issued, a fluctuation target value EXID is set and data pieces IM(1) to IM(4) in the memory group are set to initial values. The procedure then proceeds to the next step B-50. Selected as the initial values are values which do not exist as motor current values, for example, maximum values of 7FFFH for 2-byte data. On the other hand, when the fluctuation start condition is not satisfied in step B-20, the procedure proceeds directly to step B-50. If step B-30 indicates that the fluctuation has already been in progress, the procedure proceeds to step B-60. How to set a fluctuation target value will be described later.

Then, if no fluctuation start command is issued (step B-50) or fluctuation is even in progress with the data IM(4) in the memory group set to the initial value (step B-60), the procedure proceeds to the ID fluctuation processing shown in FIG. 11 by skipping the fluctuation region calculation processing and optimum ID decision processing. More particularly, even during pause of fluctuation and progress of fluctuation, these two processings to be described later will not executed before motor current data in the memory group are all exchanged with new data after the commencement of fluctuation, thereby ensuring that minimum value search can be carried out under the new condition following a change in current.

<Fluctuation Region Calculation Processing>

The fluctuation region calculation processing will be described with reference to FIG. 15. In step C-10, a rate of change of motor current GRT with respect to an exciting current command is calculated using the five sets of exciting current command and motor current data stored in the first memory group. In particular, a GRT is obtained pursuant to expression shown in the figure from a difference $\Delta$IM between maximum and minimum values of five motor current data pieces and a difference $\Delta$ID between exciting current command data pieces corresponding to the maximum and minimum values. Then, the fluctuation width IDW is adjusted in accordance with the magnitude of the thus obtained GRT (step C-20). A rule for adjustment is such that the IDW is made to be small when the GRT is large and conversely the IDW is made to be large when the GRT is small. Through this, the pulsating width of the motor current caused to change with a fluctuation of the exciting current command can be prevented from increasing or decreasing excessively to make the pulsating width of the motor current substantially uniform for any fluctuation regions of exciting current.

Figure 15:
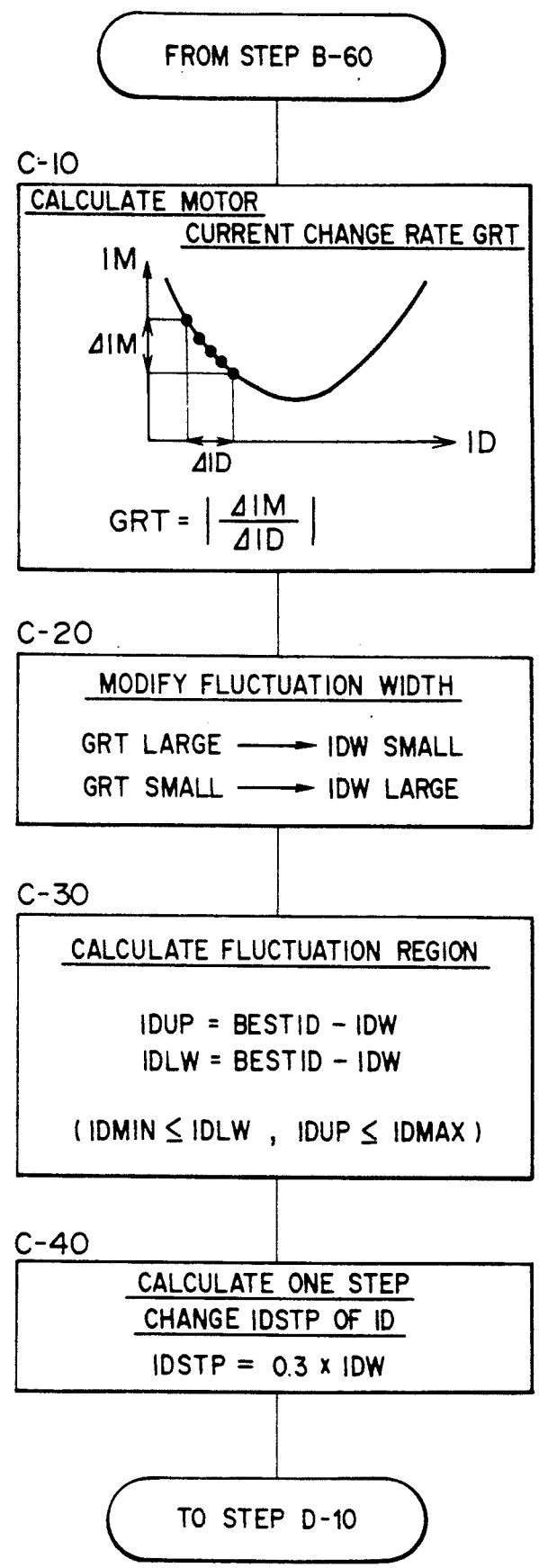
FIG. 15 is a flow chart showing a detailed construction of a third step of the main control processing in the embodied inverter apparatus.

Subsequently, by using the BESTID previously described in connection with step A-30 and the aforementioned IDW, the upper and lower limit values IDUP and IDLW for defining the fluctuation region are calculated (step C-30) pursuant to calculation expressions as shown in FIG. 15 which correspond to expression 4.

[Expression 4]

$IDUP = BESTID + IDW$ $IDLW = BESTID - IDW$ where limitations are imposed o IDUP and IDLW to force them to meet the conditions of expression 3. With the IDUP limited to a maximum value IDMAX, a value less than the IDMAX by fluctuation width IDW is determined to be a BESTID and a lower limit value IDLW is prepared. With the IDLW limited to a minimum value IDMIN, a value larger than the IDMIN by fluctuation width IDW is determined to be a BESTID and an upper limit value IDUP is prepared.

In the next step C-40, one step change IDSTP of ID is determined which is 30% of IDW. The ID fluctuation processing is executed repetitively at the short sampling period every long sampling period by cycles which coincide with the number of of IDSTP's thus obtained.

<Optimum ID Decision Processing>

Figure 16:
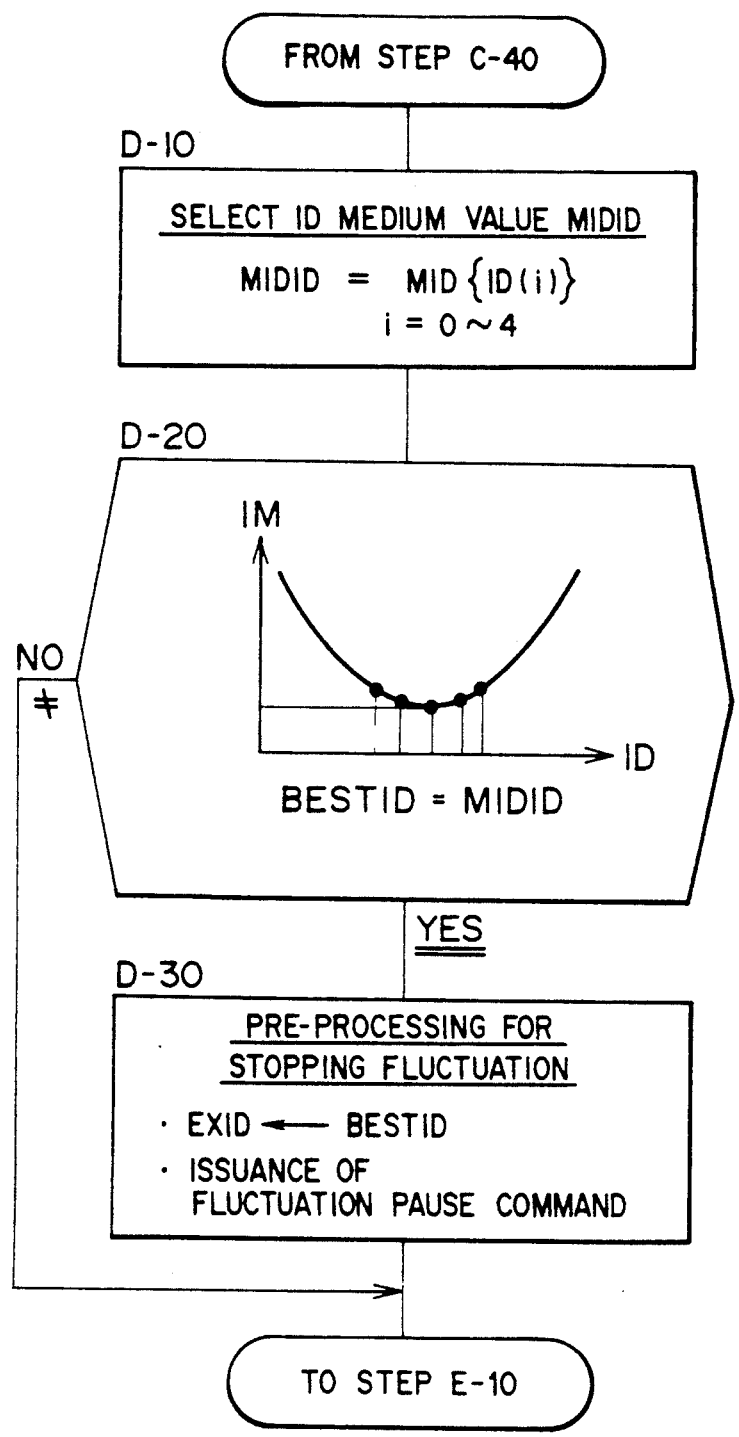
FIG. 16 is a flow chart showing a detailed construction of a fourth step of the main control processing in the embodied inverter apparatus.

FIG. 16 shows the contents of the optimum ID decision processing. In step D-10, five exciting current command data pieces ID(0) to ID(4) in the memory group are arranged from larger one to smaller one or vice versa and data of a medium value is selected as a MIDID. If the MIDID is equal to the BESTID (step D-20), a pre-processing for stopping fluctuation is executed (step D-30). In the fluctuation stopping preprocessing, the target value EXID for fluctuation is set to the BESTID and a fluctuation pause command is issued.

<ID Fluctuation Processing>

The ID fluctuation processing will be described by making reference to FIG. 17. Firstly, an exciting current command Iid* at that time is checked for its equality with a target value EXID (step E-10) and if unequalness is determined, the Iid* is so updated as to approach the EXID (step E-60). Conversely, if equality is determined, the procedure proceeds to step E-30 when the issuance of a fluctuation start command has been done but it ends when the issuance of a pause command has been done. Only when it is determined in step E-30 that the upper limit value IDUP equals a maximum value IDMAX or the lower limit value IDLW equals a minimum value and that data IM(4) in the memory group is unequal to the initial value, the procedure proceeds to step E-40 but if not so, the program proceeds to step E-50 (step E-30). In other words, when the upper limit of a fluctuation region has already reached the maximum or the lower limit has already reached the minimum, indicating that the present instant is not immediately after the commencement of fluctuation, preparation for fluctuation pause is carried out in step E-40 by setting a BESTID at that time in the target value and issuing a fluctuation pause command. If not so, the target value EXID is updated in step E-50. In this case, the direction of fluctuation is switched by setting a lower limit value at that time in the EXID if the EXID at that time is an upper limit value IDUP or conversely setting an upper limit value at that time in the EXID if the EXID at that time is a lower limit value IDLW.

<Setting of Target Value upon Commencement of Fluctuation>

Figure 18:
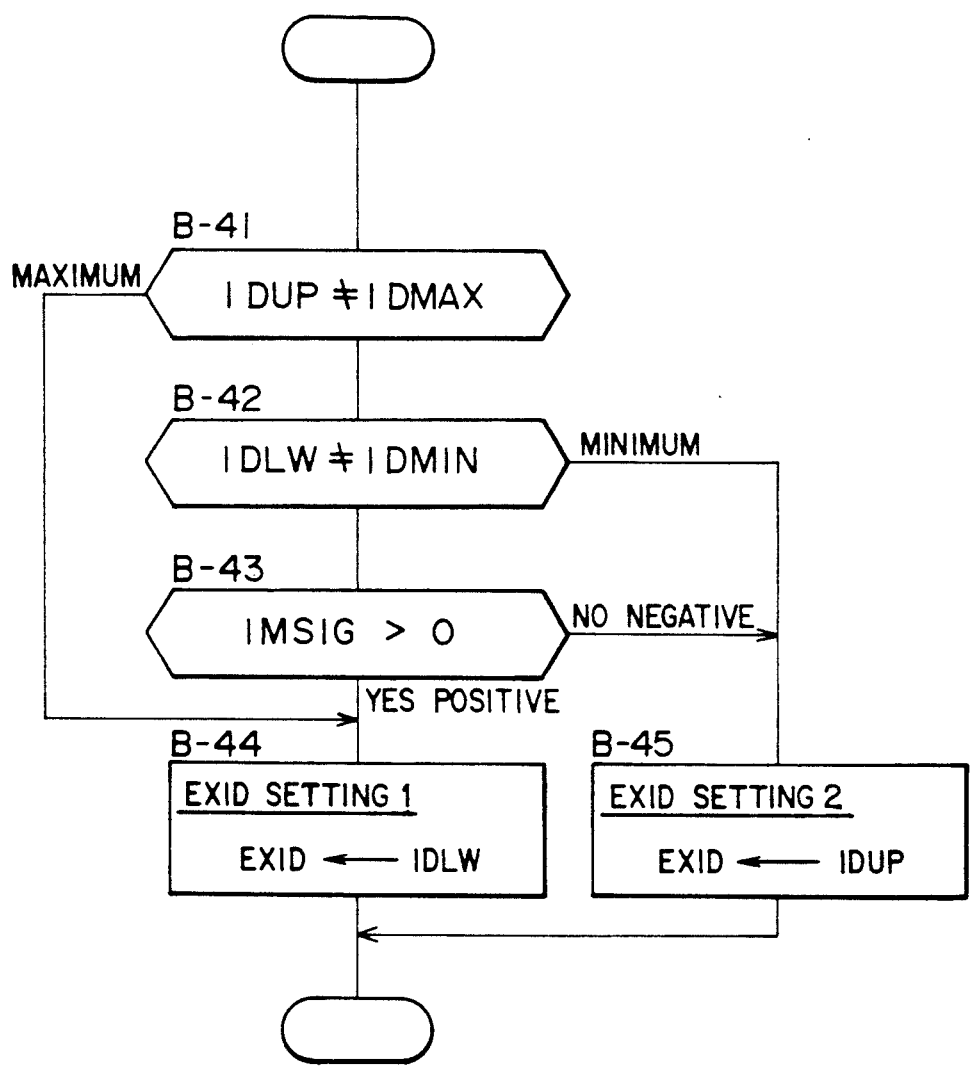
FIG. 18 is a flow chart showing a detailed construction of a sixth step of the main control processing in the embodied inverter apparatus.

FIG. 18 is a flow chart showing an embodiment of a method of setting a target value at the time of the commencement of fluctuation, which setting is carried out in step B-40 in FIG. 14. As shown therein, when the upper limit value IDUP equals the maximum value IDMAX or when the equality is negated but current changes increasingly (motor current change integrated value IMSIG is positive), the lower limit value IDLW is set in the target value. Conversely, when the lower limit value IDLW equals the minimum value IDMIN or when the equality is negated but current changes decreasingly (motor current change integrated value is negative), the upper limit value IDUP is set in the target value. Namely, when the fluctuation region is within the limit, the fluctuation of the exciting current command is started in a direction opposite to the direction of change of the motor current. When the fluctuation region has reached a limit value, the fluctuation is started in a departing direction from the limit value.

<Operational Description>.

Movement of the exciting current command in the extremum search method based on the control method set forth so far will now be described.

<When Motor Current Changes Linearly with Load Change>

Figure 19:
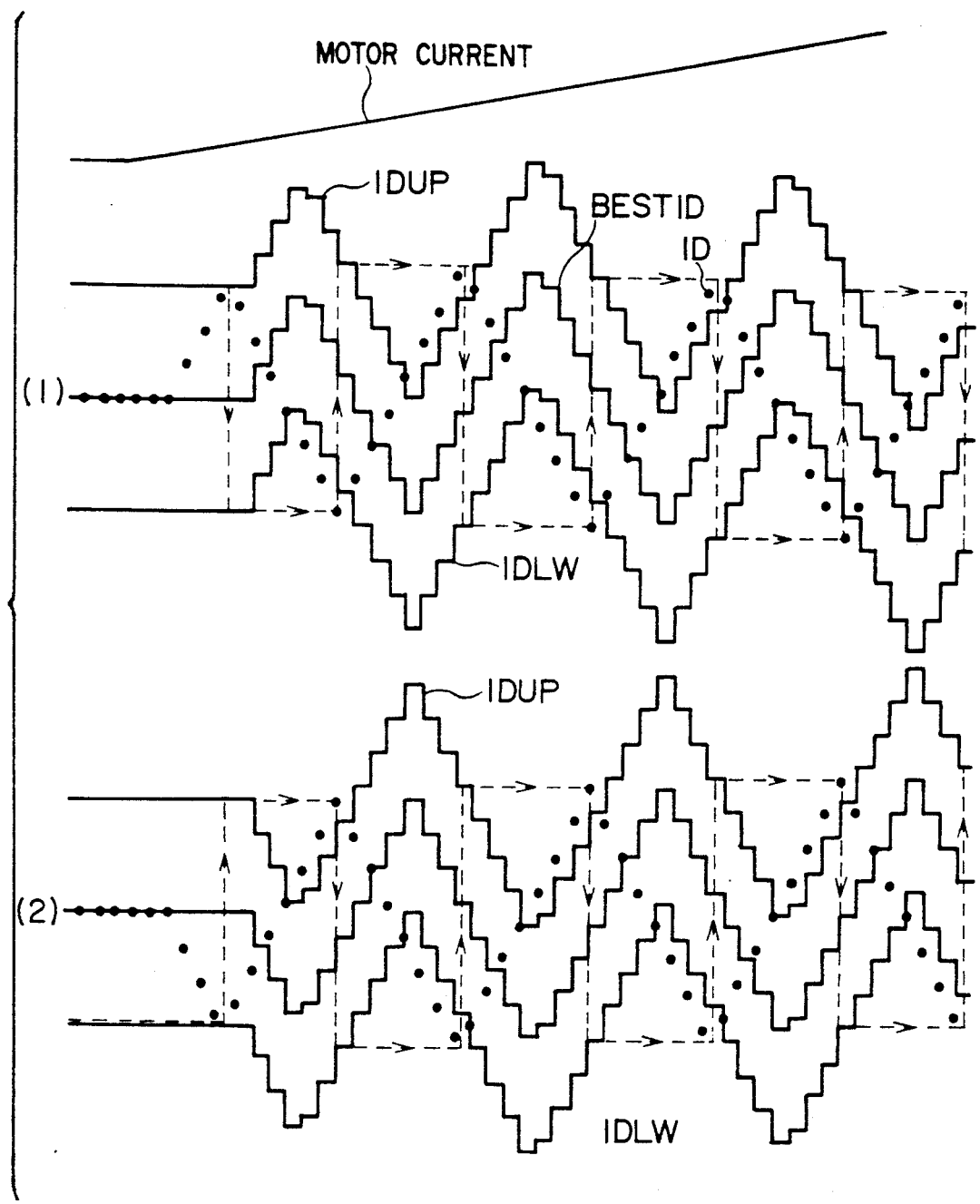
FIG. 19 is a diagram for explaining an example of operation of the embodied inverter apparatus.
Figure 20:
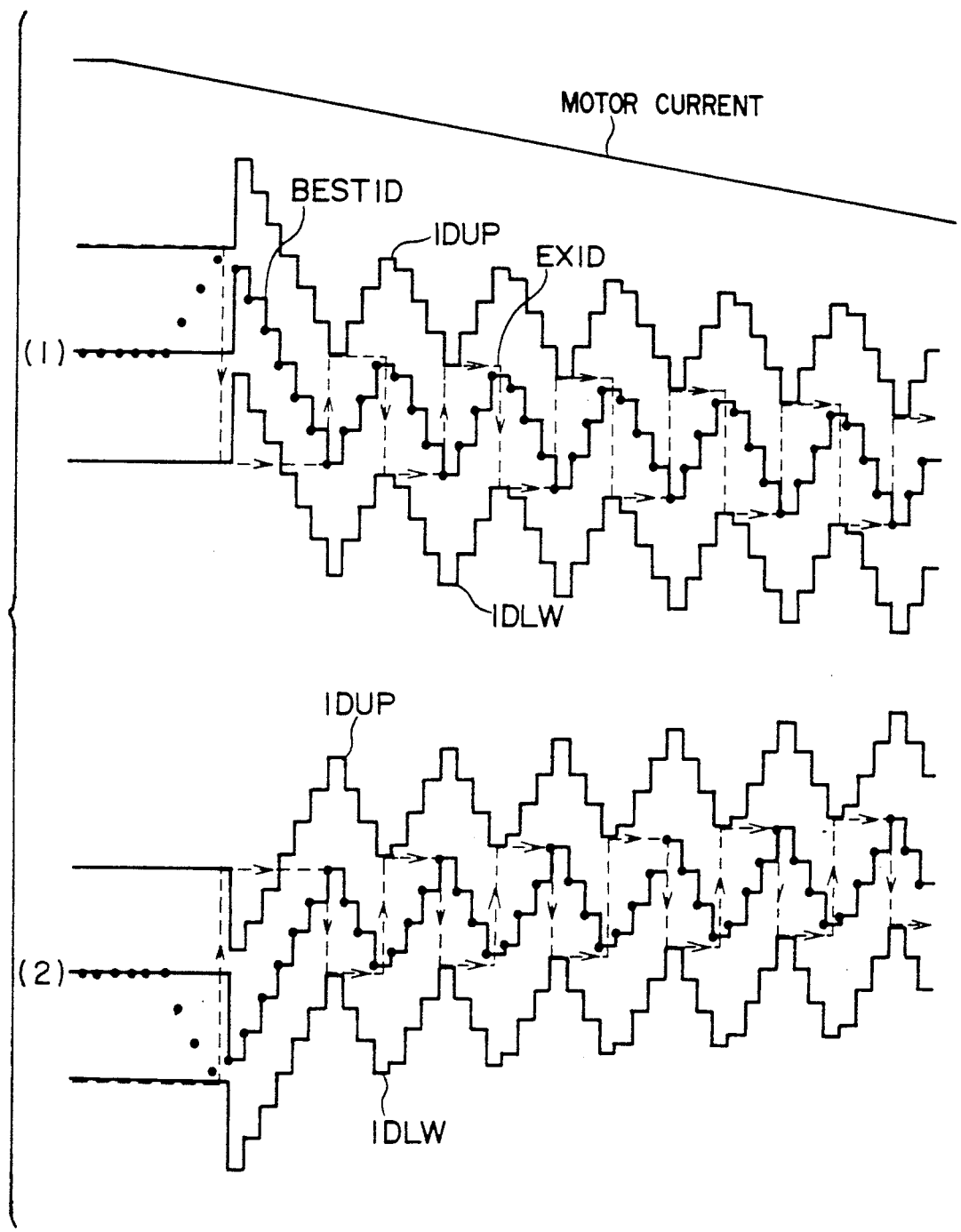
FIG. 20 is a diagram for explaining another example of operation of the embodied inverter apparatus.

When the motor current increases or decreases continuously from its minimized state, the upper limit value IDUP, BESTID, lower limit value IDLW, target value EXID and exciting current command data ID represented by a black dot mark change as shown in FIG. 19 or 20. It is assumed in these figures that a change in motor current due to a change in load is detected but a pulsation of motor current concomitant with a change in exciting current is not detected. FIG. 19 particularly shows an instance where the motor current increases and so the BESTID is the oldest one of exciting current command data pieces for five past instants inclusive of the present instant. Conversely, FIG. 20 particularly shows an instance where the motor current decreases and so the BESTID is exciting current command data at that time.

Shown at (2) in FIG. 19 and at (1) in FIG. 20 are instances where changes of exciting current commands are started in directions opposite to increasing and decreasing directions of the motor current. For example, in the case shown at (2) in FIG. 19, the fluctuation region of the exciting current increases gradually as the motor current increases. Then, with the motor current increased on account of an increase in load, the exciting current for minimizing the motor current takes a larger value at that time than before the increasing of load will be seen from FIG. 4 and therefore the aforementioned movement of the fluctuation region meets characteristics shown in FIG. 4. Likewise, FIG. 20 shows at (1) movement of the fluctuation region of exciting current command which decreases as the motor current decreases and this movement meets the characteristics of FIG. 4.

On the other hand, in instances shown at (1) in FIG. 19 and at (2) in FIG. 20, the exciting current command starts fluctuating in the same direction as the changing direction of the motor current, that is, with the motor current increased, the exciting current command starts fluctuating in its increasing direction and with the motor current decreased, the exciting current command starts fluctuating in its decreasing direction. In these instances, the fluctuation region of the exciting current command moves in the opposite direction to the changing direction of the motor current. The fluctuation start method in these instances is effective to meet the case where, in contrast to the FIG. 4 characteristics and the minimization of motor current of induction motor exemplified in the present embodiment, the value of the manipulated variable at which the controlled variable takes an extremum decreases as the disturbance increases.

<When Load Changes Stepwise>

The operation in an instance where the motor current changes stepwise will now be described by referring first to FIG. 1.

It is assumed in FIG. 1 that the load increases at time point 1 and the motor current increases sympathetically. With the motor current increased, when a motor current change integrated value IMSIG exceeds a fluctuation start allowable value IMLV and this is detected at time point 2 (step B-20), a fluctuation start command as shown at (2) in FIG. 1 is issued (step B-40). Then, for the increasing current, the target value EXID is set to a lower limit value IDLW and the exciting current command starts fluctuating in its decreasing direction (step B-44 in FIG. 18). Since at time point 3 the varying exciting current command coincides with the target value, the target value EXID is changed to an upper limit value IDUP to cause the exciting current to fluctuate in its increasing direction (step E-50). Before time point 4 at which data pieces in the memory group 12 are all updated to new data pieces, the fluctuation region calculation processing and optimum ID decision processing are not carried out and so the upper and lower limit values before fluctuation are maintained (step B-60). It is to be noted that a black dot mark shown at (2) in FIG. 1 represents a timing that motor current data IM(0) is stored in the memory group 12 and a black dot mark shown at (4) in FIG. 1 represent a timing for storage of exciting current command data ID(0) in the memory group 12.

After time point 4, a series of processings are executed in which an exciting current command data piece corresponding to a minimum of five motor current data pieces is determined to be a BESTID (step A-30), an upper limit value IDUP and a lower limit value IDLW which define a fluctuation region centered on the thus determined BESTID are calculated (step C-30) and the BESTID is decided as to whether to be an optimum value (step D-20). At time points 5 and 6, the target value EXID is changed.

It is now assumed that a minimum value of the motor current can be searched out at time point 7. Namely, when a data piece taking a medium value of the five exciting current command data pieces ID(0) to ID(4) assumptively equals a BESTID (ID(2) in the illustrated example), a fluctuation pause command is issued as shown at (3) in FIG. 1 and the target value EXID is set to the BESTID, i.e., ID(2), thus completing the minimum value search. Thereafter, the exciting current command at that time is changed to the optimum exciting current command. More specifically, on the assumption that the BESTID at that time is a first exciting current command and the exciting current command delivered at that time (corresponding to ID(0) in the illustrated example) is a second exciting current command, the first command is smaller than the second command and therefore the exciting current command is changed in its decreasing direction.

An instance shown in FIG. 21 will now be described. This differs from the FIG. 1 example in that the upper limit value IDUP equals a maximum value IDMAX and consequently the exciting current fluctuation region is limited.

Figure 21:
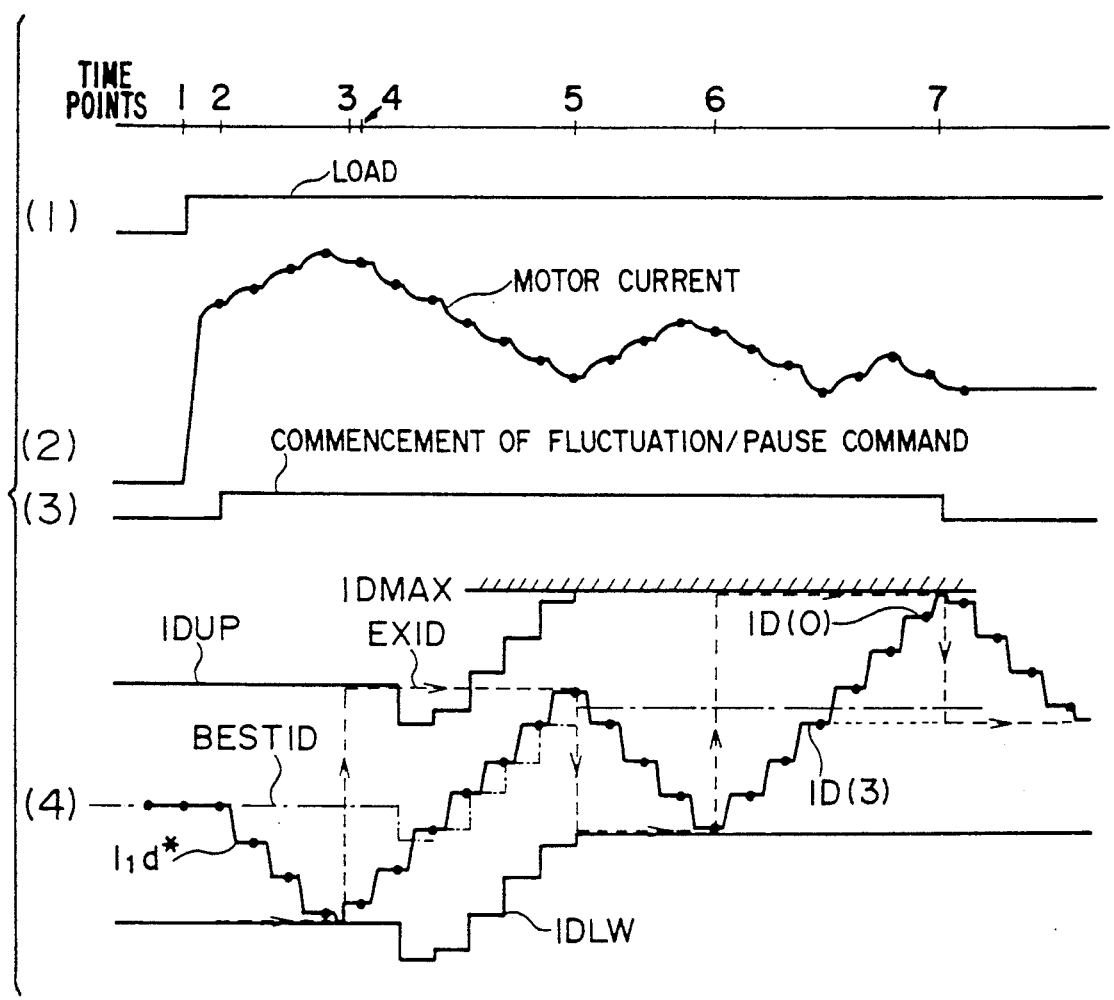
FIG. 21 is a diagram for explaining still another example of operation of the embodied inverter apparatus.

In the procedure in which the load changes and the minimum value is searched by fluctuating the exciting current command, at time point 5 shown in FIG. 21, an upper limit value IDUP prepared on the basis of a BES- TID at that time tends to exceed a maximum value IDMAX. In this case, as has been explained in connection with step C-30 in FIG. 15, the upper limit value IDUP behaves as the maximum value IDMAX, so that a value less than IDMAX by a fluctuation width IDW is determined to be a BESTID and a value less than the BESTID by the fluctuation width IDW is determined to be a lower limit value IDLW. Then, as shown in FIG. 21, the target value EXID is switched at time point 5 to a lower limit value IDLW at that time to change the direction of fluctuation and subsequently, at time point 6 that coincidence with the lower limit value occurs, the target value EXID is changed to an upper limit value IDUP at that time, i.e., the maximum value IDMAX.

Assumptively, at time point 7, the varying exciting current command coincides with the target value which is the maximum value. At that time, the processing of step E-40 in FIG. 17 is executed to issue a fluctuation pause command as shown at (3) in FIG. 21 and a BESTID at that time is set to a target value EXID, thus completing the minimum value search processing. Thereafter, the processing is executed in which the exciting current is changed from the exciting current command at that time, i.e., the maximum value to the BESTID. More specifically on the assumption that exciting current command data ID(3) corresponding to a minimum motor current data piece at time point 7 is a first exciting current command and the exciting current command at that time which is the maximum value IDMAX is a second exciting current command, the first exciting current command is smaller than the second exciting current command and therefore the exciting current command is changed in its decreasing direction.

In the above operational example shown in FIG. 21, the upper limit value IDUP behaves as the maximum value IDMAX to limit the exciting current fluctuation region but conversely, with the lower limit value IDLW behaving as the minimum value IDMIN to limit the exciting current fluctuation region, when the exciting current command fluctuating toward the lower limit value coincides with the lower limit value, i.e., the minimum value, the movement of the fluctuation region is stopped and the target value is set to a BESTID at that time. More specifically, on the assumption that the BESTID at that time is a first exciting current command and the exciting current command at that time, i.e., the maximum value is a second exciting current command, the first exciting current command is larger than the second exciting current command and therefore the exciting current command is changed in its increasing direction.

<Resumption of Fluctuation from Fluctuation Region Limited State>

With reference to FIGS. 22(a)–22(b), movement of the exciting current command will be described by referring to an instance where from the state that the fluctuation region is limited as described with reference to FIG. 21, that is, the state that the upper limit value IDUP equals the maximum value IDMAX or conversely the lower limit value IDLW equals the minimum value IDMIN, the load changes and the minimum value search resumes.

An instance shown in FIG. 22(a) is directed to the former case and since the upper limit value IDUP is the maximum value IDMAX, the target value EXID is set to the lower limit value IDLW after a change in motor current is recognized and the exciting current command starts fluctuating in a direction for departure from the maximum value IDMAX (step B-44 in FIG. 18). On the other hand, an instance shown in FIG. 22(b) is directed to the latter case and since the lower limit IDLW is the minimum value IDMIN, the target value EXID is set to the upper limit value IDUP and the exciting current command starts fluctuating in a direction for departure from the minimum value IDMIN (step B-45 in FIG. 18).

In accordance with the resumption method described as above, the exciting current command will not reach the limit value rapidly and stopping of the fluctuation can be prevented, thus ensuring that the exciting current can be fluctuated within a wide range defined by the upper and lower limit values to permit correct minimum value search.

<Another Embodiment of Changing Method for Target Value>

Figure 17:
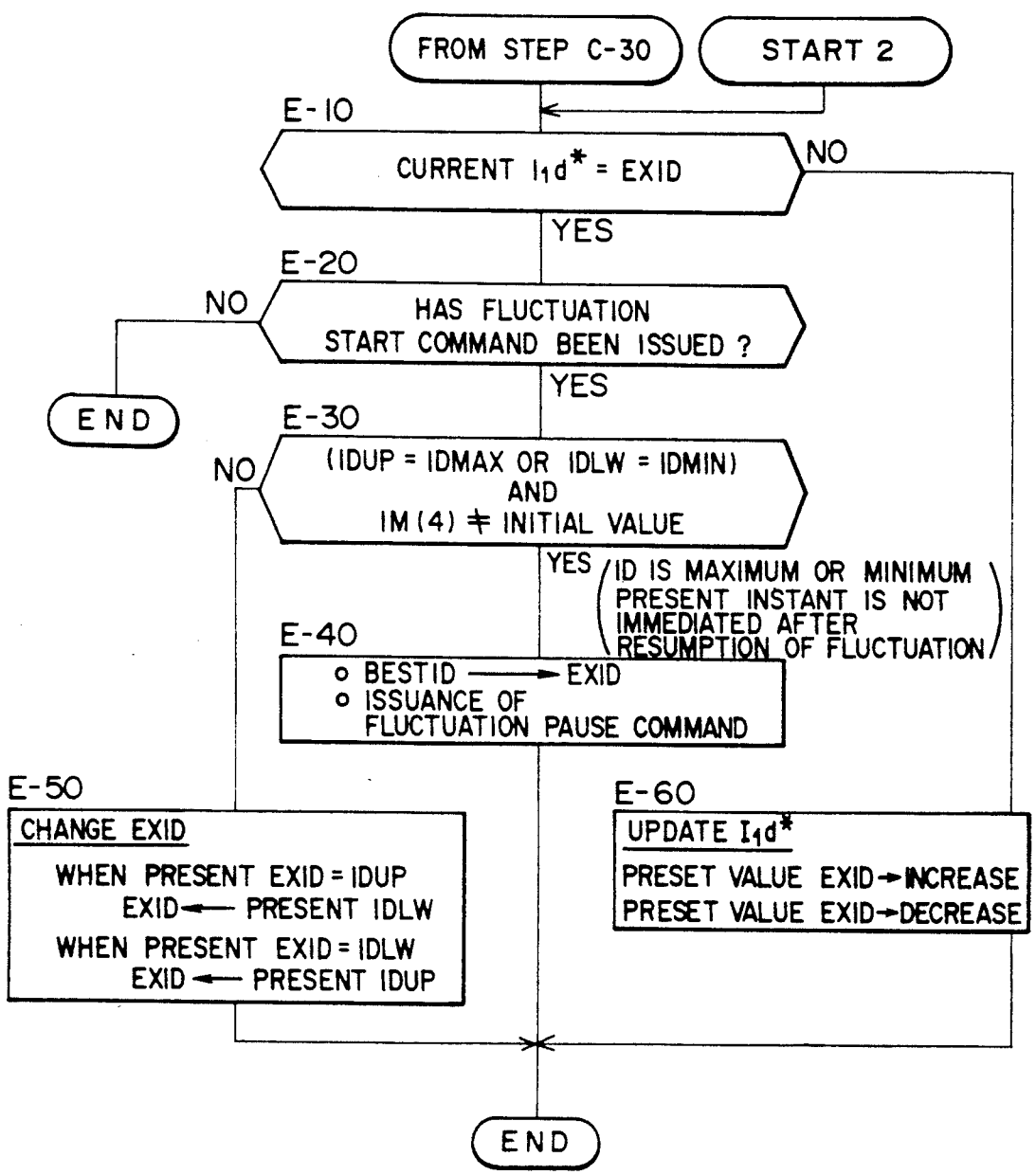
FIG. 17 is a flow chart showing a detailed construction of a fifth step of the main control processing in the embodied inverter apparatus.

In the changing method for target value EXID described in the foregoing embodiment, as shown in FIG. 17, only when the varying exciting current command Ild* coincides with the target value EXID, the upper limit value IDUP or the lower limit value IDLW is changed. Contrarily, in a method described in this embodiment, each time that the upper limit value or the lower limit value is updated, the target value is changed to the latest upper limit value or lower limit value. To this end, the ID fluctuation processing shown in FIG. 17 is headed with contents of processing as shown in FIG. 23. More specifically, if the target value at that time has been an upper limit value, a new target value is set to an upper limit value at that time but if the target value at that time has been a lower limit value, a new target value is set to a lower limit value at that time.

Figure 24:
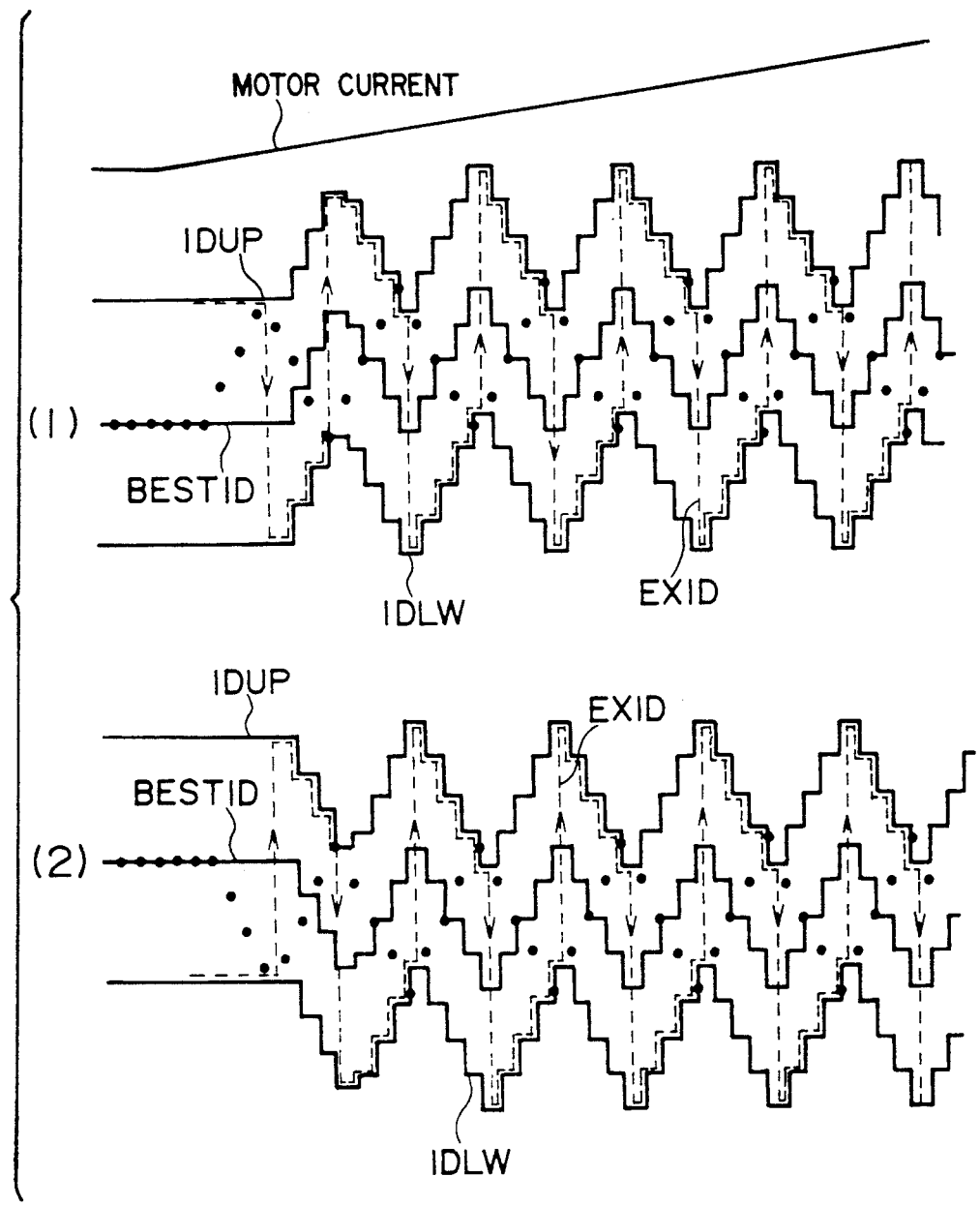
FIG. 24 is a diagram for explaining the operation of the modified inverter apparatus.

FIG. 24 is a diagram to explain the above target value changing method and it corresponds to FIG. 19. Particularly shown in FIG. 24 is the movement of fluctuation region occurring when the motor current increases continuously and the exciting current starts fluctuating. It is also assumed in FIG. 24 that a change in motor current concomitant with the exciting current fluctuation cannot be detected. When the fluctuation of exciting current command starts in its increasing direction as shown at (1) in FIG. 24, the center of the fluctuation region is raised from the initial state so as to be maintained at the raised state and the exciting current command changes repetitively to go above and below the raised state; and when the fluctuation of exciting current command starts in its decreasing direction as shown at (2) in FIG. 24, the center of the fluctuation region is lowered from the initial state so as to be maintained at the lowered state and the exciting current command changes repetitively to go above and below the lowered state. Thus, in contrast to the foregoing example, the fluctuation region does not increase as the motor current increases.

<Movement of Winding Current>

Figure 25:
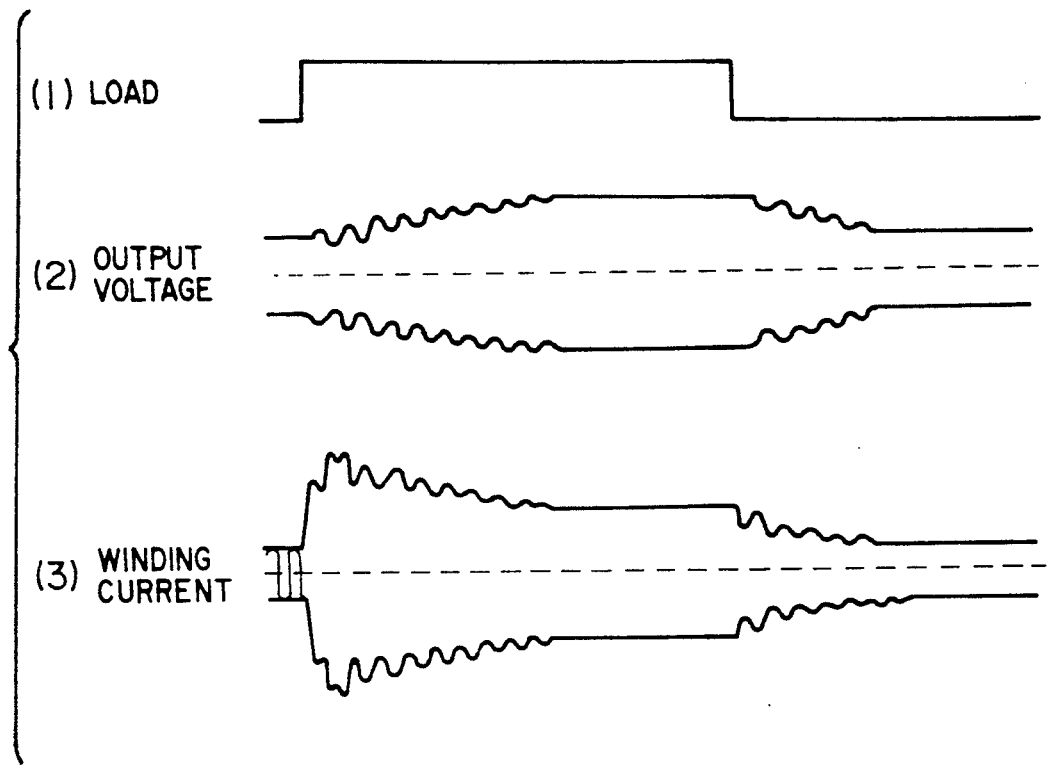
FIG. 25 is a diagram for explaining how to change output voltage and winding current in the embodied inverter apparatus.

In the embodiments of the extremum search method described previously, winding current flowing in the winding of the induction motor moves as shown in FIG. 25. The inverter output voltage and winding current change when the load increases and decreases stepwise as shown at (1) in FIG. 25 and in the figure, an envelope (locus of peak value) of the change of the inverter output voltage is shown at (2) in FIG. 25 and that of the winding current is shown at (3) in FIG. 25.

More particularly, as the load changes from a minimum state thereof to cause the winding current to change, the output voltage is so changed that the winding current takes a new state and pulsates around the new state by assuming averaged values of pulsation which are directed to a minimum.

<Effects of Embodiment of the Invention>

Figure 26:
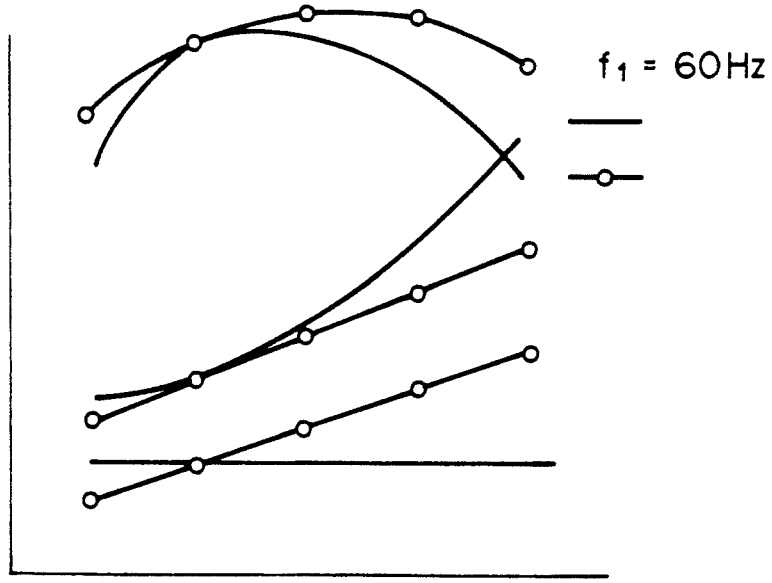
FIG. 26 is a graph useful in explaining effects of the embodied inverter apparatus.

Specific effects brought about by the embodiment of the invention are graphically shown in FIG. 26, where abscissa represents load torque and ordinate represents inverter output voltage, winding current and total efficiency of the inverter and motor which are respectively obtained with and without the minimization control.

As will be seen from the figure, without the minimization control, the inverter output voltage is constant regardless of the load, the winding current is large and the efficiency is degraded. But by practicing the control for minimization of current of the induction motor according to the invention, the efficiency can be improved and the winding current can be lowered for the same load, thereby making it possible to reduce the inverter capacity and suppress the temperature rise. Further, the temperature rise in the compressor loaded on the induction motor can also be suppressed to improve the efficiency of the compressor. As will be noted, values of the efficiency and winding current in the absence of the minimization control are the same as those of the efficiency and winding current in the presence of the minimization control at a certain load state. This is because even in the absence of the minimization control, the winding current is minimized only at that load state. Therefore, when the minimization control is applied, its effect is highlighted in proportion to the distance of the load torque from that load state.

Although the foregoing embodiment has been described a being directed to the method for minimization of current of the induction motor adapted to drive such a load as the compressor of air conditioner and refrigerator, the present invention is not limited thereto and may be applied to any control system in which the extremum of the controlled variable with respect to the manipulated variable is changed by the disturbance as shown in FIG. 2(a). For example, the invention may also be applied to an inverter apparatus of an induction motor adapted to drive a fan or a pump.

<Another Embodiment of the Invention>

Figure 27:
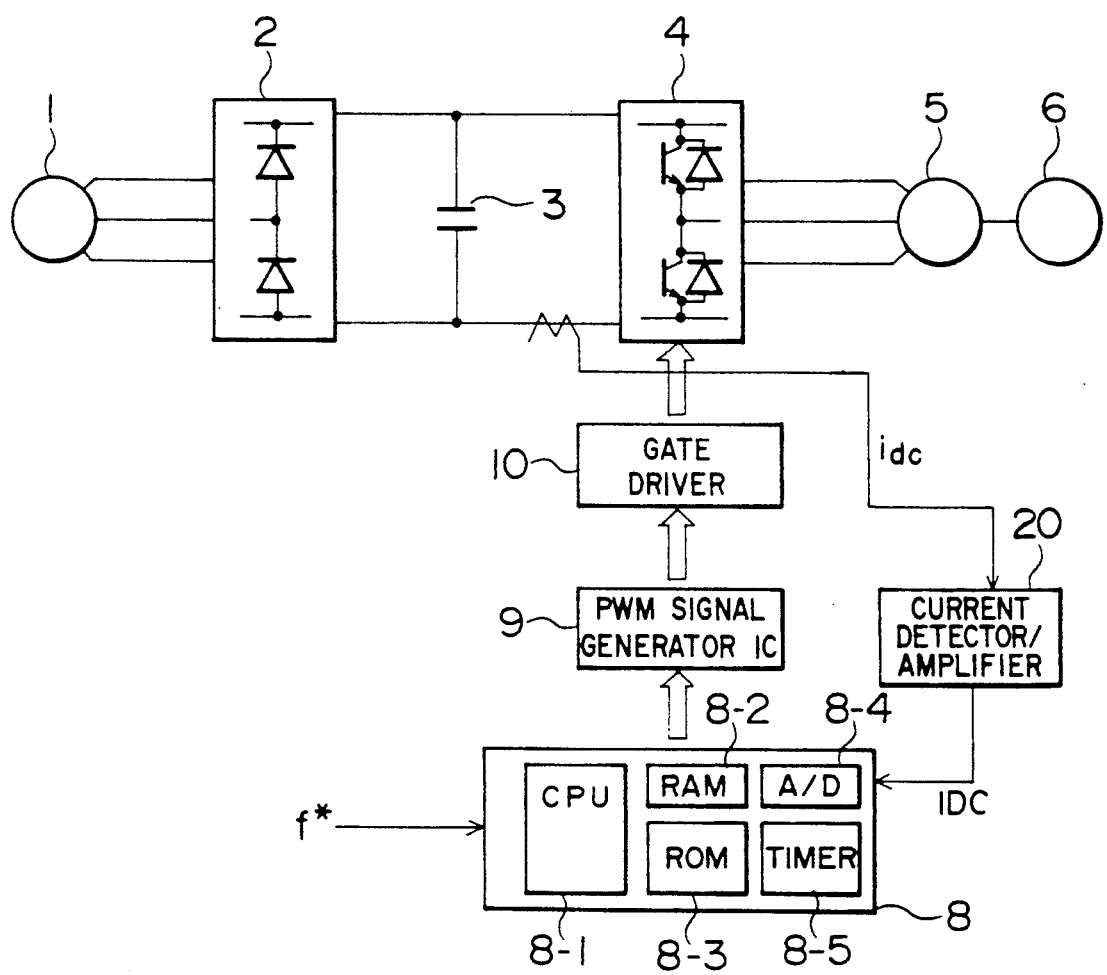
FIG. 27 is a block diagram showing an overall construction of another embodiment of an inverter apparatus according to the invention.

Another embodiment of the invention is shown in FIG. 27. In the foregoing embodiment of FIG. 5, the winding current of the AC motor is detected and used as the controlled variable but differently, in the present embodiment a DC current idc is detected by a current detector/amplifier 20 and an output signal IDC is used as the controlled variable. Currents as viewed from the input and output of the inverter are of DC and AC to differ from each other but the magnitude of current in terms of an average value is substantially the same for both the currents. Accordingly, the present embodiment directed to detection of the controlled variable on the DC side of the inverter is advantageous over the foregoing embodiment in that only one current detector suffices and rectifying operation means for determining an average value of current is dispensed with, thus simplifying the construction and decreasing the control operation processing time to permit high-speed response, to advantage.

As described above, the present invention attains the following meritorious effects.

(1) Even when the disturbance or the motor load is changing, the minimum value of the motor current standing for the controlled variable can be searched without recognizing the change to obtain an inverter output voltage standing for the manipulated variable which corresponds to the minimum value.

(2) The motor current can be minimized without being affected by noise components and ripples contained in the detected value of the motor current standing for the controlled variable.

(3) By virtue of the above advantages, the minimization of the motor current according to the invention can be free from not only local extrema caused by noise or varying disturbance but also the divergence phenomenon that the search for extrema is done in vain to cause the manipulated variable to increase or conversely decrease excessively, thereby ensuring stable operation and very high practicality.

We claim:

1. A method of controlling an inverter in which the inverter receiving direct current and delivering alternating current drives an AC motor controllably comprising the steps of using at least one of an AC output voltage of the inverter and an exciting current of the AC motor as a manipulated variable, wherein when a motor current of the AC motor increases or decreases starting from a running state at which the motor current is a certain value, changing said manipulated variable while a frequency of the AC output voltage is fixed to pulsate the motor current and said frequency is sequentially determined in a direction in which an average value of the pulsating motor current decreases gradually.

2. A method of controlling an inverter in which the inverter receiving direct current and delivering alternating current drives an AC motor controllably comprising the steps of using an AC output voltage as a manipulated variable, wherein when motor current increases or decreases starting from a running state at which input current to said motor is constant, changing said manipulated variable at a running state subject to an increased or decreased motor current to pulsate the motor current and said frequency is sequentially determined in a direction in which an average value of the pulsating motor current decreases gradually;

wherein a fluctuation region is set up to permit said manipulated variable to fluctuate within a range defined by predetermined upper and lower limit values, and said fluctuation region is moved as the time elapses in a direction in which a change width of the input current or output current of said inverter standing for a controlled variable is decreased.

3. An inverter control method according to claim 2 wherein for said fluctuation region, a first target value and a second target value are set which are defined by said upper and lower limit values, respectively, said manipulated variable is changed to approach one of said target values and when said manipulated variable tends to exceed said one target value, the other target value is set to an upper limit value or a lower limit value at that time, said manipulated variable is changed to approach the thus set target value and said two target values are moved as the time elapses in a direction in which a change width of the controlled variable decreases gradually.

4. An inverter control method according to claim 2 wherein for movement of said fluctuation region, there are provided a plurality of sets of paired data pieces of said manipulated variable and a corresponding controlled variables which is obtained before movement, a manipulated variable of a set having a corresponding controlled variable which is an extremum is selected from said plurality of sets, and the fluctuation region of manipulated variable is decided sequentially such that the selected manipulated variable falls within the fluctuation region.

5. An inverter control method according to claim 2 wherein the fluctuation width of said fluctuation region is so selected as to be small when the absolute value of a rate of change of said controlled variable relative to said manipulated variable is large but to be large when the absolute value of the change rate is small.

6. An inverter control method according to claim 2 wherein said manipulated variable and the corresponding controlled variable are put together to set up a set, at least three sets are stored in a memory group, a memory of one set of the manipulated variable and controlled variable is updated every predetermined period in said memory group, a manipulated variable of a set having a corresponding controlled variable which is an extremum is selected from said memory group, said fluctuation region is so reset that said selected manipulated variable may fall within said fluctuation region, and a next value of the manipulated variable is set in a direction in which said selected manipulated variable approaches an upper limit value or a lower limit value of said fluctuation region.

7. An inverter control method according to claim 6 wherein said predetermined period is divided into a first time period and a second time period, the manipulated variable is changed stepwise at a period shorter than said predetermined period in said first time period but is made to be constant in said second time period, and at least one set of the manipulated variable and controlled variable of said memory group is stored in said memory group before said second time period ends and the first time period of a next predetermined period begins.

8. An inverter control method according to claim 6 wherein in said memory group, when a controlled variable corresponding to a manipulated variable having a medium value is the smallest of all the controlled variables in said memory group, the movement of the fluctuation region is stopped.

9. An inverter control method according to claim 6 wherein at the commencement of changing said manipulated variable during the pause of movement of said fluctuation region, said manipulated variable is permitted to start changing when a change amount of said controlled variable exceeds a predetermined allowable value, whereby when the change amount increases, said manipulated variable is changed in its decreasing direction but in its increasing direction when the change amount decreases.

10. An inverter control method according to claim 6 wherein a maximum value and a minimum value of said manipulated variable are set up, whereby when the upper limit value of said fluctuation region tends to exceed said maximum value or when the lower limit value of said fluctuation region tends to exceed said minimum value, the upper limit value of said fluctuation region is set to said maximum value or the lower limit value of said fluctuation region is set to said minimum value, and when the varying manipulated variable reaches said upper limit value or said lower limit value, a manipulated variable corresponding to a controlled variable in said memory group which is an extremum at that time is selected and determined and the movement of said fluctuation region is stopped.

11. An inverter control method according to claim 10 wherein at the commencement of changing said manipulated variable during the pause of movement of said fluctuation region, said manipulated variable is permitted to start changing when a change amount of said controlled variable exceeds a predetermined allowable value, whereby when an upper limit value of fluctuation region of said manipulated variable at that time is said maximum value of manipulated variable, said manipulated variable is so set as to change in its decreasing direction but when a lower limit value of fluctuation region of said manipulated variable at that time is said minimum value of manipulated variable, said manipulated variable is so set as to change in its increasing direction.

12. An inverter control method according to claim 2 wherein the contents of one control processing is defined by changing of said manipulated variable and detection of a controlled variable corresponding to a manipulated variable after changing, at least three control processings ar executed to provide resulting sets of manipulated variable and controlled variable which are of the same number as that of the executed control processings, a manipulated variable of a set having a corresponding controlled variable which is an extremum and a manipulated variable which has already been delivered at the latest time point are selected as a first manipulated variable and a second manipulated variable, respectively, from said sets, and the second manipulated variable is so set as to change in the succeeding control processing in its increasing direction when said first manipulated variable is larger than said second manipulated variable but in its decreasing direction when said first manipulated variable is smaller than said second manipulated variable.

13. An apparatus for controlling an inverter which converts direct current into alternating current and controllably drives an AC motor, comprising:
means for generating a command value for an AC output voltage of said inverter;
means for controlling said inverter on the basis of said output voltage command value;
means for detecting an AC output current of said inverter;
means for converting the magnitude of said AC output current into a DC variable;
at least three memory elements for storing paired data pieces of said output voltage command value and said DC variable corresponding thereto every predetermined time interval;
means for calculating a minimum value from at least three data pieces of said DC variable from said memory elements; and
means for comparing an output voltage command values corresponding to said minimum value with data pieces representative of other output voltage command values from said memory element and changing the output voltage command value at said inverter AC output voltage command value generating means in its increasing direction when said output voltage command value corresponding to said minimum value is larger that the data pieces representative of the other output voltage command values but conversely in its decreasing direction when said output voltage command value corresponding to said minimum value is smaller than said data pieces representative of the other output voltage command values.

14. An apparatus for controlling an inverter which converts direct current into alternating current and controllably drives an AC motor, comprising:

means for generating an exciting current command value for said AC motor;

means for calculating a command for an AC output voltage of said inverter on the basis of said exciting current command value;

means for controlling said inverter on the basis of said output voltage command value;

means for detecting an AC output current of said inverter;

means for converting the magnitude of said AC output current into a DC variable;

at least three memory elements for storing paired data pieces of said exciting current command value and said DC variable corresponding thereto every predetermined time interval;

means for calculating a minimum value from at least three data pieces of said DC variable from said memory elements; and means for comparing an exciting current command value corresponding to said minimum value with data pieces representative of other exciting current command values from said memory element and changing the exciting current command value at said exciting current command value generating means in its increasing direction when said exciting current command value corresponding to said minimum value is larger than the data pieces representative of the other exciting current command values but conversely in its decreasing direction when said exciting current command value corresponding to said minimum value is smaller than said data pieces representative of the other exciting current command values.

15. An apparatus for controlling an inverter which converts direct current into alternating current and controllably drives an AC motor, comprising:

means for generating a command value for an AC output voltage of said inverter;

means for controlling said inverter on the basis of said output voltage command value;

means for detecting a DC input current of said inverter;

at least three memory elements for storing paired data pieces of said output voltage command value and a DC current detected value corresponding thereto every predetermined time interval;

means for calculating a minimum value from at least three data pieces of said DC current detected value from said memory elements; and means for comparing an output voltage command value corresponding to said minimum value with data pieces representative of other output voltage command values from said memory elements and changing the output voltage command value at said inverter AC output voltage command value at said inverter AC output voltage command value generating means in its increasing direction when said output voltage command value corresponding to said minimum value is larger than the data pieces representative of the other output voltage command values but conversely in its decreasing direction when said output voltage command value corresponding to said minimum value is smaller than said data pieces representative of the other output voltage command values.

16. An apparatus for controlling an inverter which converts direct current into alternating current and controllably drives an AC motor, comprising:

means for generating an exciting current command value for said AC motor;

means for calculating a command for an AC output voltage of said inverter on the basis of said exciting current command value;

means for controlling said inverter on the basis of said output voltage command value;

means for detecting a DC input current of said inverter;

at least three memory elements for storing paired data pieces of said exciting current command value and a DC current detected value corresponding thereto every predetermined time interval;

means for calculating a minimum value from at least three data pieces of said DC current detected value from said memory elements; and means for comparing an exciting current command value corresponding to said minimum value with data pieces representative of other output voltage command values from said memory elements and changing the exciting current command value at said exciting current command value generating means in its increasing direction when said exciting current command value corresponding to said minimum value is larger than the data pieces representative of the other exciting current command value but conversely in its decreasing direction when said exciting current command value corresponding to said minimum value is smaller than said data pieces representative of the other exciting current command values.

17. An inverter control apparatus according to claim 13, wherein said apparatus is adapted to control an inverter which drives, at varying speeds, an induction motor for driving a compressor.

18. An inverter control apparatus according to claim 14, wherein said apparatus is adapted to control an inverter which drives at varying speeds, an induction motor for driving a compressor.

19. An inverter control apparatus according to claim 15, wherein said apparatus is adapted to control an inverter which drives, at varying speeds, an induction motor for driving a compressor.

20. An inverter control apparatus according to claim 16, wherein said apparatus is adapted to control an inverter which drives, at varying speeds, an induction motor for driving a compressor.

21. An inverter control apparatus according to claim 13, wherein said apparatus is adapted to control an inverter which drives, at varying speeds, an induction motor for driving one of a fan and a pump.

22. An inverter control apparatus according to claim 14, wherein said apparatus is adapted to control an inverter which drives, at varying speeds, an induction motor for driving one of a fan and a pump.

23. An inverter control apparatus according to claim 15, wherein said apparatus is adapted to control an inverter which drives, at varying speeds, an induction motor for driving one of a fan and a pump.

24. An inverter control apparatus according to claim 16, wherein said apparatus is adapted to control an inverter which drives, at varying speeds, an induction motor for driving one of a fan and a pump.

* * * * *